US010133353B2

(12) United States Patent
Eid

(10) Patent No.: US 10,133,353 B2
(45) Date of Patent: Nov. 20, 2018

(54) THREE DIMENSIONAL TACTILE FEEDBACK SYSTEM

(71) Applicant: NEW YORK UNIVERSITY, New York, NY (US)

(72) Inventor: Mohamad Eid, Abu Dhabi (AE)

(73) Assignee: NEW YORK UNIVERSITY, New York, NY (US)

( * ) Notice: Subject to any disclaimer, the term of this patent is extended or adjusted under 35 U.S.C. 154(b) by 12 days.

(21) Appl. No.: 15/403,027

(22) Filed: Jan. 10, 2017

(65) Prior Publication Data

US 2017/0123499 A1    May 4, 2017

Related U.S. Application Data

(63) Continuation-in-part of application No. PCT/US2015/040045, filed on Jul. 10, 2015.

(60) Provisional application No. 62/023,538, filed on Jul. 11, 2014.

(51) Int. Cl.
*G06F 3/01* (2006.01)
*G10K 11/34* (2006.01)
*G06F 3/0481* (2013.01)

(52) U.S. Cl.
CPC .............. *G06F 3/016* (2013.01); *G06F 3/017* (2013.01); *G06F 3/04815* (2013.01); *G10K 11/346* (2013.01); *G06F 2203/014* (2013.01)

(58) Field of Classification Search
CPC ............................. G06F 3/016; G06F 3/04815
USPC ........................................................ 345/156
See application file for complete search history.

(56) References Cited

U.S. PATENT DOCUMENTS

| | | | | |
|---|---|---|---|---|
| 4,926,870 A | * | 5/1990 | Brandenburger | A61B 8/0875 600/437 |
| 5,509,413 A | * | 4/1996 | Akama | A61B 8/06 600/438 |
| 5,643,179 A | * | 7/1997 | Fujimoto | A61N 7/02 601/2 |
| 9,144,905 B1 | * | 9/2015 | Sinapov | B25J 9/1671 |
| 2006/0133198 A1 | * | 6/2006 | Fisher | H01L 27/14601 367/13 |
| 2007/0239005 A1 | * | 10/2007 | Ogasawara | A61B 8/14 600/437 |
| 2011/0199342 A1 | | 8/2011 | Vartanian et al. | |
| 2014/0340209 A1 | * | 11/2014 | Lacroix | G06F 3/016 340/407.2 |

OTHER PUBLICATIONS

Culjat, M.O., et al., "Remote tactile sensing glove-based system", 32nd Annual International Conference of the IEEE EMBS, Aug. 31-Sep. 4, 2010, pp. 1550-1554.

(Continued)

*Primary Examiner* — Joseph Haley
*Assistant Examiner* — Chineyere Wills-Burns
(74) *Attorney, Agent, or Firm* — Foley & Lardner LLP

(57) ABSTRACT

A three dimensional tactile feedback includes a two dimensional array of ultrasonic transducers and a control device configured to control the ultrasonic transducers. The ultrasonic transducers re configured to project discrete points of tactile feedback in three dimensional space. The tactile feedback system is configured to continuously switch the discrete points of tactile feedback at a frequency at which a human is capable of perceiving tactile stimulation in order to produce tactile stimulation of a three dimensional object in free space.

18 Claims, 23 Drawing Sheets

(56) References Cited

OTHER PUBLICATIONS

Alexander, J. et al., "Adding Haptic Feedback to Mobile TV", Extended Abstracts of the International Conference on Human Factors in Computing Systems, Vancouver, BC, Canada, May 7-12, 2011, 6 pages.
Carter, T., et al., "UltraHaptics: Multi-Point Mid-Air Haptic Feedback for Touch Surfaces", UIST 2013, Oct. 8-11, 2013, 10 pages.
Comai, S. et al., "Integrating Haptics in Web Interfaces: State of the Art and Open Issues", IEEE on Internet Computing, Sep./Oct. 2012, pp. 83-87.
Eid, M., "Haptogram: Aerial Display of 3D Vibrotactile Sensation", 5th IEEE International Workshop on Hot Topics in 3D, Hot3D, Chengdu, China, 2014, 5 pages.
Eid, M., et al., "HugMe: A Haptic Videoconferencing System for Interpersonal Communication", VECIMS 2008, Jul. 14-16, 2008, pp. 5-9.
Focus website, <http://www.egr.msu.edu/~fultras-web/>, accessed Apr. 1, 2014, Michigan State University.
Hasegawa, K., et al., "Aerial Display of Vibrotactile Sensation with High Spatial-Temporal Resolution using Large-Aperture Airborne Ultrasound Phased Array", IEEE World Haptics Conference, Apr. 14-18, 2013, pp. 31-36.
Hasegawa, T., et al., "A General Theory of Rayleigh and Langevin Radiation Pressures", Acoustical Science and Technology, 2000, 21(3):145-152.
Hoshi, T et al., "Noncontact Tactile Display Based on Radiation Pressure of Airborne Ultrasound", IEEE Transactions on Haptics, Jul.-Sep. 2010, 3(3):155-165.
Kyung, K-U., et al., "Precise Manipulation of GUI on a Touch Screen with Haptic Cues", Proc. of the 3rd Eurohaptics Symposium and Symposium on Haptic Interfaces for Virtual Environment and Teleoperator Systems, Mar. 18-20, 2009, pp. 202-207.
Lemmens, P., et al., "A body-conforming tactile jacket to enrich movie viewing", Third Joint Eurohaptics Conference and Symposium on Haptic Interfaces for Virtual Environment and Teleoperator Systems, Salt Lake City, UT, Mar. 18-20, 2009, pp. 7-12.
Nishino, H., et al.,"A Touch Screen Interface Design with Tactile Feedback", 2011 International Conference on Complex, Intelligent and Software Intensive Systems, 2011, pp. 53-60.
Onishi, J., et al., "Fundamental Study on Tactile Cognition through Haptic Feedback Touchscreen", 2013 IEEE International Conference on Systems, Man, and Cybernetics (SMC), 2013, pp. 4207-4212.
Saga, S., et al., "Lateral-Force-Based 2.5-Dimensional Tactile Display for Touch Screen," IEEE Haptics Symposium 2012 (HAPTICS), Mar. 4-7, 2012, pp. 15-22.
Senseg, "The Senseg Tixel", <http://senseg.com/technology/senseg-technology>, accessed Apr. 1, 2014.
Skedung, L., et al., "Feeling Small: Exploring the Tactile Perception Limits", Nature, Sep. 12, 2013, 3(2617):1-6.
Suzuki, Y., et al., "Air Jet Driven Force Feedback in Virtual Reality," IEEE Computer Graphics and Applications, Jan./Feb. 2005, 25(1):44-47.
Tsetserukou, D., et al., "Affective Haptic Garment Enhancing Communication in Second Life", 3rd International Conference on Affective Computing and Intelligent Interaction and Workshops, 2009, pp. 1-2.
Tsetserukou, D., et al., "Affective Haptics in Emotional Communication", Proceedings of the International Conference on Affective Computing and Intelligent Interaction, 2009, 6 pages.
Wang, D., et al., "Haptic Overlay Device for Flat Panel Touch Displays", Proc. of the 12th Int'l Symposium on Haptic Interfaces for Virtual Environment and Teleoperator Systems (HAPTICS'04), 2004, p. 209.
Yoshino, K., "Visio-Acoustic Screen for Contactless Touch Interface with Tactile Sensation", IEEE World Haptics Conference 2013(WHC), Apr. 14-18, 2013, pp. 419-423.
International Search Report and Written Opinion for Application No. PCT/US2015/040045, dated Oct. 1, 2015, 9 pages.

\* cited by examiner

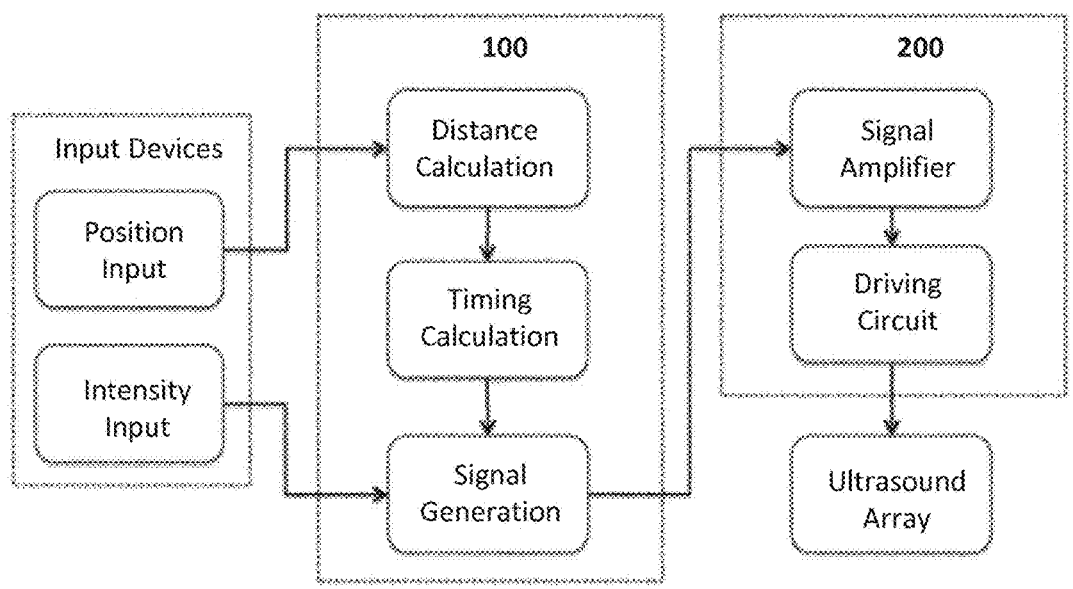
Fig. 1
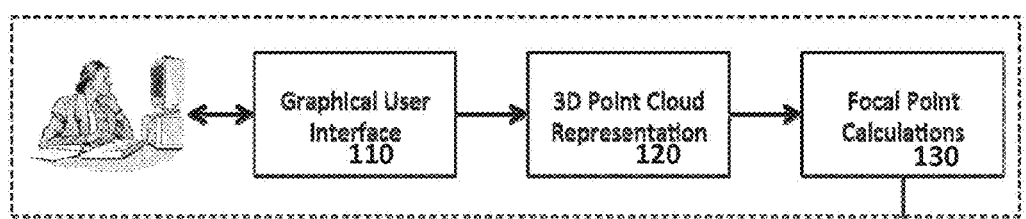
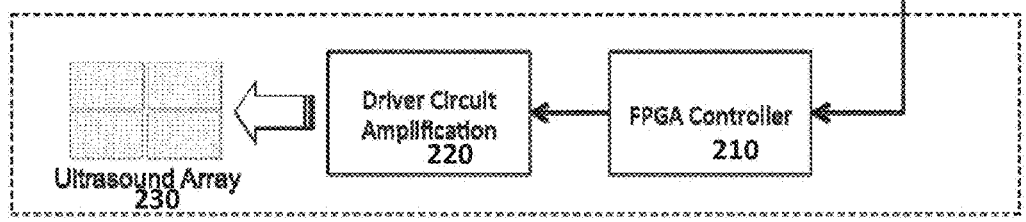
Fig. 2

230

THREE DIMENSIONAL TACTILE FEEDBACK SYSTEM

CROSS-REFERENCE TO RELATED APPLICATIONS

This application is a continuation-in-part of PCT Application No. PCT/US2015/040045 filed on Jul. 10, 2015, which claims the benefit of U.S. Provisional Application No. 62/023,538 filed on Jul. 11, 2014, both of which are hereby incorporated by reference in their entireties.

TECHNICAL FIELD

The present disclosure relates generally to a three dimensional tactile feedback system. More specifically, the present disclosure relates to a system designed to provide a three dimensional tactile feedback by employing acoustic radiation pressure.

BACKGROUND

Natural and three dimensional (3D) interfaces are getting popular these days. The popularity of 3D interfaces is mainly due to the spread of 3D capture, authoring, and display interfaces (such as 3D contents generation technologies, 3D authoring tools, 3D display interfaces, hologram technology). Adding 3D haptic feedback to these interfaces is the next natural step to achieve a natural and intuitive human computer interaction.

A tactile interface displays information using the sense of touch such as shape, surface texture, roughness, and temperature onto the human skin. Tactile displays have been proposed in a wide spectrum of applications, including virtual reality, Tele-operation, interpersonal communication, entertainment and gaming, military, and health care.

Ultrasonic noncontact tactile display is based on the phenomenon of acoustic radiation pressure. When the focused ultrasound beam is reflected by the surface of an object, the surface is subjected to a constant force in the direction of the incident beam.

Previous research related to tactile displays can be divided into three categories: wearable display, touch screen display, and non-touch display. Wearable tactile display embeds vibrotactile actuators in wearable devices to make a direct contact with the human skin. The touch screen display has vibrotactile actuation technology integrated in the visual/auditory display interface (such as the touch screen) and displays tactile information when the user makes a contact with the touch screen. Non-touch tactile display uses wireless means to stimulate tactile sensation on the human skin (such as focused ultrasound waves).

Most of the current tactile display devices are of the wearable display class. The iFell_IM system is a wearable interface designed to enhance emotional immersion in a virtual world called Second Life™. Three groups of haptic gadgets are built. The first group is intended for implicit emotion elicitation (e.g., HaptiHeart, HaptiButterfly, HaptiTemper, and HaptiShiver), the second group functions in a direct way (e.g., HaptiTickler), and the third group uses a sense of social touch (e.g., HaptiHug) for influencing the mood and providing some sense of physical co-presence A touch panel (screen) interface enables a user to manipulate graphical user interfaces through tactile stimulation to strengthen the intuitiveness and directness of interaction. There are commercially available touch screen devices with tactile interaction capabilities (e.g., "TouchSense"™ from Immersion and "Sensegs Tixel"™ from Senseg), as well as research prototypes. For instance, in one research prototype, a lateral-force-based 2.5-dimensional display was introduced and it was determined that users' impressions of "press", "guide", and "sweep" are essential features for touchscreen.

Lately there has been extensive research conducted into using tactile displays based on ultrasound waves due to their ability to alter the default feeling of touch for the user. One such example is a hybrid display using an ultrasonic vibrator and force feedback. It provides a realistic texture sensation, where multiple factors such as roughness, softness and friction are accounted for while taking care of the interference among the parts. User experience shows high correlation between real materials and their hybrid artificial touch counterparts. Another ultrasound tactile display is based purely on amplitude modulated ultrasonic vibration, where the aim is to replicate the sensation of an ordinary piece of textile using the aforementioned technique. The experimental results show that the artificial sensation highly correlates with its natural version according to test subjects.

A contactless touch screen with tactile feedback that stimulates tactile sensation 1-3 cm in front of the screen surface has been proposed. A single point of tactile stimulation is generated using an airborne ultrasound phased array.

Air jets are also utilized to create non-contact force feedback where fans or air cannons are used in theme parks to amaze visitors. Although they are effective in simulating a rough "force" feedback, their spatial/temporal properties are limited and they cannot provide fine tactile feedback.

A more convenient approach in designing non-touch displays is using airborne ultrasound. A tactile display has been presented that utilized airborne ultrasound to produce tactile sensations with 16 mN at a virtual point in space. The demonstrated prototype has a spatial resolution of 20 mm and produces vibrations up to 1 kHz. Experiments showed that users could identify the tactile stimulus generated by the device and were able to discriminate its moving direction. A similar work that utilized a two dimensional array of ultrasonic transducers to generate concentrated pressure at an arbitrary point in a larger workspace has also been developed. This multi-point haptic feedback system (e.g., UltraHaptics) is used over an interactive surface that is capable of producing independent feedback points in relation to on-screen elements. However, the UltraHaptics system is limited to two dimensional surface display.

Yoshino discloses a contactless touch interface is demonstrated that is developed with blind people as its target audience. See Yoshino, K. et al., "Contactless touch interface supporting blind touch interaction by aerial tactile stimulation," 2014 IEEE Haptics Symposium (HAPTICS), pp. 347-350, 2014, the entire contents of which is incorporated by reference in its entirety. The system consists of two separate sensible layers for guidance and operation, respectively. Tactile feedback is also part of the system. A user study is conducted with high success rate and an average time of 6.5 seconds for finding the next button.

The exact ultrasonic pressure field created by ultrasonic actuators is also a relevant field of research. Hoshi presents an approach for measuring the strength of the ultrasonic pressure field. See Hoshi, T. et al., "Non-contact tactile sensation synthesized by ultrasound transducers," Third Joint Symposium on Haptic Interfaces for Virtual Environment and Teleoperator Systems, pp. 256, 260, 2009, the entire contents of which is incorporated by reference in its entirety. The approach achieved a spatial resolution of less than 0.1 mm with a minimal detectable pressure of 50 kPa (compared to atmospheric pressure) on a 2-D cross-sectional area of 15 mm by 5 mm. Furthermore, Svein-Erik Masoy explores the overall radiation pressure field of a system comprising of two ultrasonic transducers with different radiation frequencies. See Svein-Erik Masoy, Thor Andreas Tangen et al., "Nonlinear propagation acoustics of dual-frequency wide-band excitation pulses in a focused ultrasound system", Journal of the Acoustical Society of America, vol. 128, no. 5, 2010, the entire contents of which is incorporated by reference in its entirety. Simulation results closely agree with experimental measurements and the investigators conclude with a number of considerations for designing dual-frequency ultrasound systems.

Two dimensional tactile feedback systems, which construct two dimensional objects, have been described in the prior art. For example, Hoshi discloses a compact that enables users not only to operate computers by moving their hands in mid-air, but also to feel haptic feedback on their hands. See Hoshi, Takayuki, "Compact Device for Markerless Hand Tracking and Noncontact Tactile Feedback," SICE Annual Conference 2013, Nagoya University, Nagoya, Japan (Sep. 14-17, 2013), the entire contents of which is incorporated by reference in its entirety. The device consists of a depth camera for hand tracking and a noncontact tactile display for haptic feedback. See id. The tactile display utilizes focused ultrasound to produce tactile stimulation from a distance. See id. Further background information on tactile displays for transmission of sensory data to a human by an acoustic method based on the effect of radiation pressure can be found in Gavrilov, L. R., "The Possibility of Generating Focal Regions of Complex Configurations in Application to the Problems of Stimulation of Human Receptor Structures by Focused Ultrasound," Acoustical Physics, Vol. 54, No. 2, pages 269-278 (2008), the entire contents of which is incorporated by reference in its entirety.

The devices mentioned do not produce tactile sensations of three dimensional objects by way of airborne ultrasound. A need exists for improved technology that generates acoustic radiation forces at points in 3D space and constructs a 3D object.

SUMMARY

Various embodiments relate to a three dimensional tactile feedback device. The tactile feedback device comprises a two-dimensional array of ultrasonic transducers and a control device configured to control the ultrasonic transducers. The ultrasonic transducers are configured to project discrete points of tactile feedback in three dimensional space. The tactile feedback device is configured to continuously switch the discrete points of tactile feedback at a frequency at which a human is capable of perceiving tactile stimulation (such as 1 KHz) in order to produce tactile stimulation of a three dimensional object in free space.

Other embodiments relate to a method of producing a tactile stimulation of a three dimensional object. The method comprises providing a three dimensional tactile feedback device comprising a two dimensional array of ultrasonic transducers and a control device configured to control the ultrasonic transducers, projecting discrete points of tactile feedback in three dimensional space with the ultrasonic transducers, and continuously switching the discrete points of tactile feedback at a frequency at which a human is capable of perceiving tactile stimulation (such as 1 KHz) in order to produce tactile stimulation of a three dimensional object in free space.

Further embodiments relate to a computer-implemented machine for three dimensional tactile feedback comprising a processor and a three dimensional tactile feedback device. The three dimensional tactile feedback device is comprised of a two-dimensional array of ultrasonic transducers, a control device configured to control the ultrasonic transducers, and a tangible computer-readable medium operatively connected to the processor. The tangible computer-readable medium includes computer code configured to project discrete points of tactile feedback in three dimensional space with the ultrasonic transducers, and continuously switch the discrete points of tactile feedback at a frequency at which a human is capable of perceiving tactile stimulation in order to produce tactile stimulation of a three dimensional object in free space.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein.

FIG. 1 is a schematic illustration of a three dimensional tactile feedback device (i.e., a Haptogram system).

FIG. 2 is an in-depth schematic illustration of the Haptogram system of FIG. 1.

DETAILED DESCRIPTION OF VARIOUS EMBODIMENTS

Figure 3:
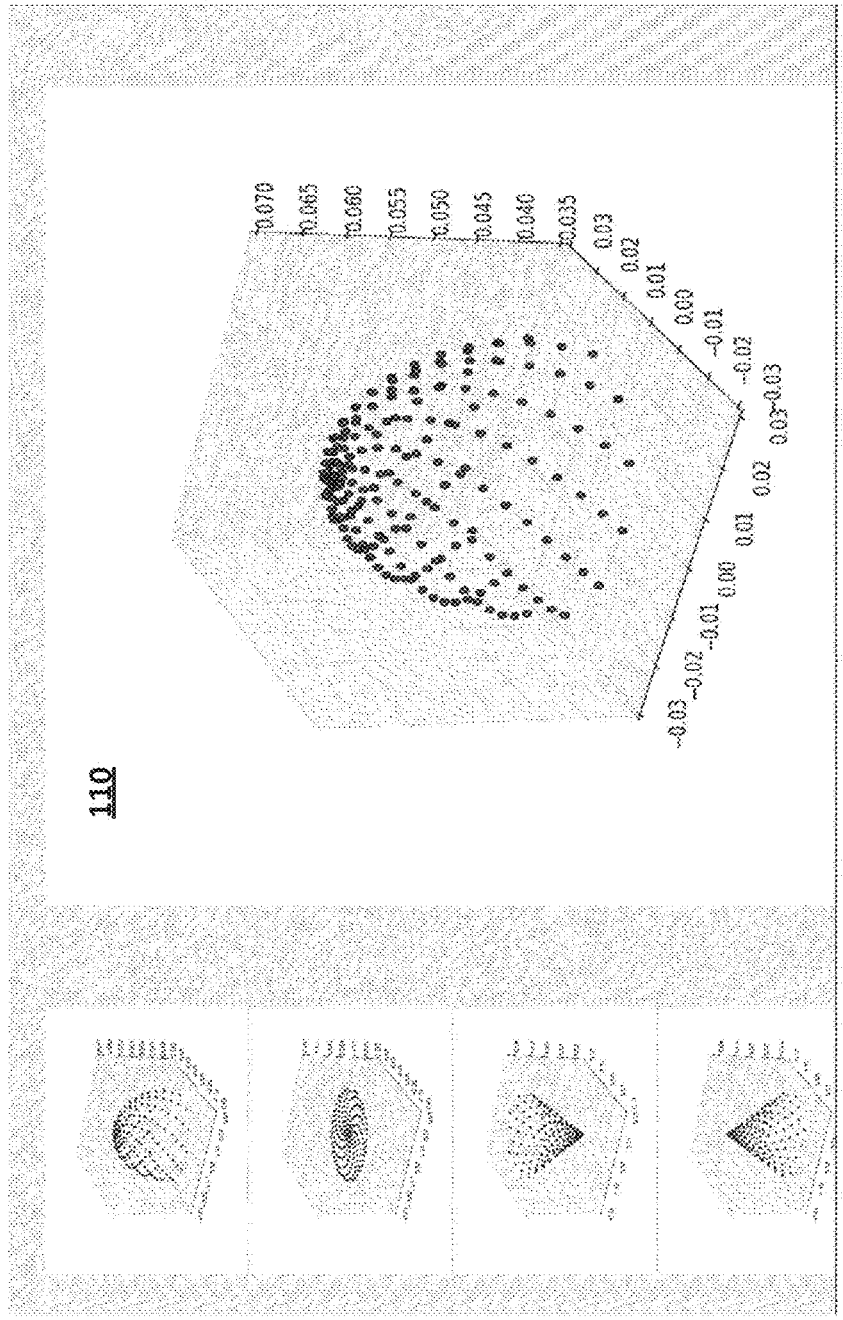
FIG. 3 is a Graphical User Interface of the Haptogram system of FIG. 1, showing a point cloud for various 3D tactile objects.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Ultrasonic tactile stimulation involves focusing multiple ultrasound beams in one or more focal points to produce tangible mid-air acoustic pressure effect. When a transducer array is driven such that the phases of the ultrasonic waves coincide at a point (i.e., a focal point), the radiation pressure will be strong enough to be perceived by human skin. Embodiments of a Haptogram system that provides 3D tactile feedback via focused ultrasound, and requires no physical contact with the human skin are described below. The Haptogram system described herein renders point-cloud 3D tactile objects and produces 3D tactile sensation by animating focal points at high speed (switching speed) so that humans feel the distributed points simultaneously. Visual rendering generates graphics to be displayed by a hologram display where haptic rendering calculates tactile forces to be displayed by the Haptogram system. The tactile sensations are displayed by generating acoustic radiation forces at focal points where a phased array of ultrasonic transducers is used to exert forces on a target point in 3D space to construct a 3D object. The system continuously switches tactile display points at a very high speed (1 kHz update rate) to display tactile sensation of the 3D object in free space. The successive focal points altogether make the 3D tactile object. Moving the point of tactile stimulation at very high speed along a 3D model creates a 3D tactile experience.

The tactile feedback device is configured to continuously switch the discrete points of tactile feedback at a frequency at which a human is capable of perceiving tactile stimulation (such as 1 KHz) in order to produce tactile stimulation of a three dimensional object in free space. Humans are capable of perceiving vibrations in a frequency range of 40 Hz to 800 Hz. In one embodiment, the tactile feedback device is configured to continuously switch the discrete points of tactile feedback at a frequency in the range of 10 Hz to 5 KHz. In an additional embodiment, the tactile feedback device is configured to continuously switch the discrete points of tactile feedback at a frequency in the range of 40 Hz to 5 KHz. In another embodiment, the tactile feedback device is configured to continuously switch the discrete points of tactile feedback at a frequency in the range of 40 Hz to 800 Hz. In yet another embodiment, the tactile feedback device is configured to continuously switch the discrete points of tactile feedback at a frequency in the range of 125 Hz to 300 Hz.

The resolution of the tactile 3D object may be varied by producing a higher or lower number of successive focal points. Producing higher resolution may take more time to display each of the points and thus would require faster hardware to implement. A higher resolution would provide a higher quality of user perception of the 3D tactile object.

The tactile stimulation produced by the Haptogram system is based on the Phased Array Focusing technique to produce the radiation pressure perceivable by the human skin. The focal point of ultrasound—a set of these points make up a 3D shape—is generated by controlling the phase delays of multiple transducers at a high update rate. When N transducers are driven so that the phases of the ultrasounds coincide at a point, the radiation pressure that is generated by the array will be large enough to be perceivable by human skin.

The theoretical derivation of the resulting sound pressure field on the 3D surface tactile points is now described. First, the specifications of the transducer array are listed. The diameters of the transducer housing and the diaphragm are d=10 mm and 8 mm, respectively. The resonant frequency is 40 KHz whereas the directivity is 80 deg.

Secondly, the sound pressure field is formulated. Let r[m] be the vector for a general transducer on the array $(x_m, y_m, 0)$ and a general focal point with coordinates $(x_0, y_0, z_0)$ on the Haptogram. The RMS sound pressure $p_0$ from that transducer onto the focal point is inversely proportional to the square of (r). Therefore, the resulting sound pressure field $P(x_0, y_0, z_0)$ is written as shown in equation (1). Equations (3) to (6) derive an expression for the acoustic radiation pressure (P) as function of the elevation (z). The final expression of the pressure field becomes as shown in equation (7).

$$P(x_0, y_0, z_0) = \sum_{m=0}^{M-1} \sum_{n=0}^{N-1} \sqrt{2}\, P(z_0) e^{j(kr-wt)} \quad (1)$$

$$r = \sqrt{(x_m - x_0)^2 + (y_m - y_0)^2 + (z_0)^2} \quad (2)$$

-continued $$P(z_0) = P_0 e^{-2\beta z_0} \quad (3)$$

$$E = \frac{1}{C} = \frac{P^2}{\rho C^2} \quad (4)$$

$$E(z_0) = E_0 e^{-2\beta z_0} \quad (5)$$

$$P(z) = \sqrt{E\rho C^2} = \sqrt{E_0 \rho} \, Ce^{-\beta z} = P_0 e^{-\beta z} \quad (6)$$

$$P(x_0, y_0, z_0, t) = \sum_{m=0}^{M-1} \sum_{n=0}^{N-1} \sqrt{2} \, P_0 e^{-\beta z_0} e^{j(kr-wt)} \quad (7)$$

In the equations above, M and N are the dimensions of the ultrasound array, $\beta$ is the attenuation coefficient of the air interface, k is the wavenumber of the ultrasound signal, w is the angular frequency ($2\pi f$), f is the resonance frequency for the ultrasound transducers, and r is the focal length.

Equation (8) determines the size of the focal point and the total force F [N] contained within a cubic unit of side $\pi f$ (geometrically derived to be as expressed in equation (9).

$$F = \frac{\alpha}{\rho c^2} \int_{-\omega_f/2}^{+\omega_f/2} \int_{-\omega_f/2}^{+\omega_f/2} \int_{-\omega_f/2}^{+\omega_f/2} \frac{|p(x_0, y_0, z_0)|^3}{3} dx_0 dy_0 dz_0 \quad (8)$$

Where $$\omega_f = \frac{4\pi r}{k\sqrt{MNd}} \quad (9)$$

Acoustic Principles and Modeling

Figure 23:
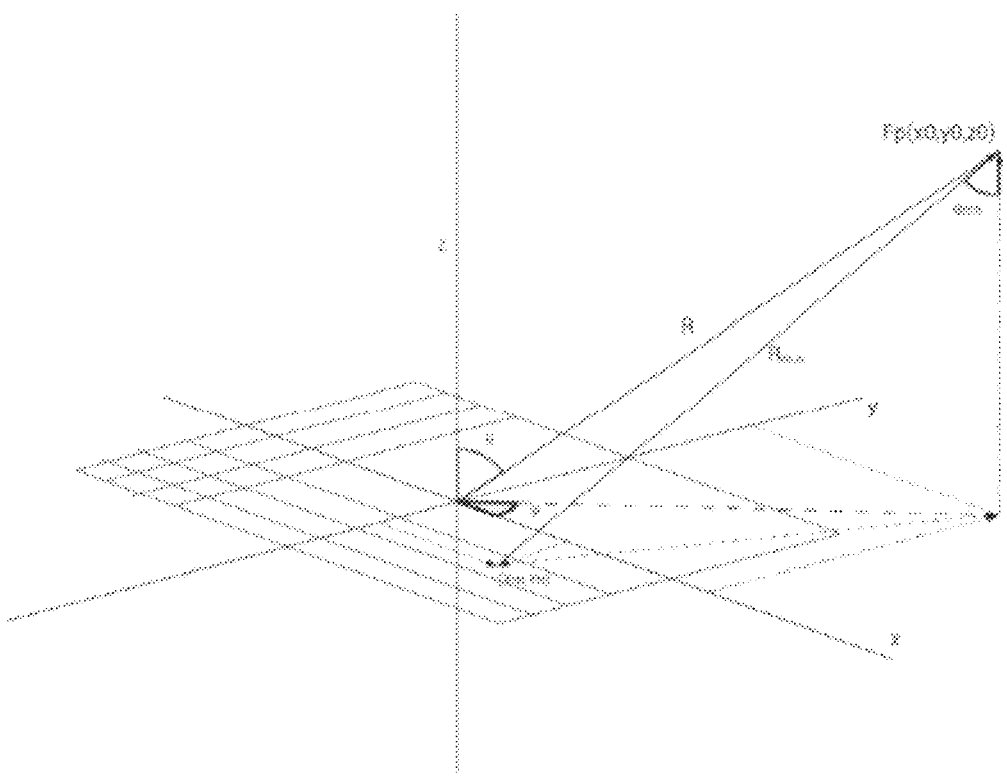
FIG. 23 illustrates a coordinate system with a 2D ultrasound array of M×N transducers and an arbitrary focal point $F_p$.

Consider the coordinate system shown in FIG. 23, with a 2D ultrasound array of M×N transducers and an arbitrary focal point $F_p$ shown in equation (10). The distance between the focal point and each transducer is divided by the speed of sound to find the ultrasound wave travel time $t_{mn}$ for each transducer as shown in equation (11), so that the ultrasound waves come in phase at the focal point to generate acoustic pressure. In equation (10), R is the distance from the origin to the focal point, $\theta$ is the incident angle, and $\varphi$ is the rotational angle. The focal law can be obtained from equation (12), and thus the transducers delays are calculated via equation (14).

$$F_p = (R \sin\theta \cos\varphi, R \sin\theta \sin\varphi, R \cos\theta) \quad (10)$$

Then for any transducer $E_{mn}$ at $(x_m, y_m, 0)$:

$$t_{mn} = \frac{\|F_p - E_{mn}\|}{c} \quad (11)$$

$$T_{mn} = \max(t_{mn}) - t_{mn} \quad (12)$$

$$\Delta T = \max(t_{mn}) - \min(t_{mn}) \quad (13)$$

$$\Delta T_{mn} = [T_{mn}] \bmod \left[\frac{\lambda}{c}\right] \quad (14)$$

Where [ ] denote the integer part in equation (14), $\lambda$ the wavelength, c the sound speed, and $\Delta T_{mn}$ is the time shift per transducer in order for all of them be in phase at the focal point. The pressure from a transducer $E_{mn}$, assuming a point source modeling, can be described as an outgoing spherical wave using equation (15), where A is the maximum pressure, R is the distance from the transducer to the focal point, $\omega$ the angular frequency, t is the time, and k is the wave number.

$$p(R, t) = \frac{A}{R} e^{j(\omega t - kR)} \quad (15)$$

For an array of transducers M*N, the pressure contributed by each transducer $p_{mn}$ ($R_{mn}$, $t_{mn}$) is calculated as shown in equation (16), where m, n=1 ... M, N. $R_{mn}$ is the distance between transducer $E_{mn}$ and the focal point, whereas $t_{mn}$ is the time it takes the ultrasound wave to travel from transducer $E_{mn}$ to the focal point.

$$p_{mn}(R_{mn}, t_{mn}) = \frac{A}{R_{mn}} e^{j(\omega t_{mn} - kR_{mn})} \quad (16)$$

where $R_{mn} = \sqrt{(x_0 - x_m)^2 + (y_0 - y_m)^2 + z_0^2}$. The total pressure can be derived as the superposition of the pressure generated by each transducer at the focal point $F_p = (x_0, y_0, z_0)$ by using the focal law. The resulting formula for the pressure field is given by equation (17).

$$p(R, \theta, t) = \sum_{mn}^{MN} \frac{A}{R_{mn}} e^{j(\omega(t + \Delta T + \Delta t_{mn}) - kR_{mn})} \quad (17)$$

A more precise modeling is to represent the transducer by a circular surface rather than a point source. Therefore, the transducer $E_{mn}$ can be replaced by the far field approximation of the Rayleigh-Sommerfeld integral model with a circular surface (piston) of radius $\alpha$, as shown in equation (18).

$$p_0(R, \theta, t) = j\omega\rho U_0 \alpha^2 \cdot \sum_{mn}^{MN} \frac{A}{R_{mn}} e^{j(\omega(t + \Delta T + \Delta t_{mn}) - kR_{mn})} \left[\frac{J_1(k\alpha \sin\theta_{mn})}{k\alpha \sin\theta_{mn}}\right] \quad (18)$$

where $$\theta_{mn} = \tan^{-1}\left(\frac{\sqrt{(x - x_m)^2 - (y - y_m)^2}}{z}\right)$$

is the angle between $R_{mn}$ and the axis perpendicular to transducers plane, whereas $J_1$ is the first order Bessel function, $U_0$ is the uniform particle velocity generated by a circular surface of radius $\alpha$, and $\rho$ is the medium density. The far field approximation is accurate for distances that satisfy $$R \gg \frac{d^2}{4\lambda},$$

where d is $2\alpha$.

Haptogram System Overview

In general, a three dimensional tactile feedback device (i.e., a Haptogram system 1000) is comprised of a software subsystem 100 and a hardware subsystem 200, as illustrated in FIGS. 1 and 2. As seen in FIG. 1, an Input Devices component acquires position and intensity knowledge about a three dimensional model through the Position Input and Intensity Input units, respectively. The software subsystem 100 is programmed to perform at least the following functions: 1) distance calculation to compute distance between the three dimensional model and a two dimensional ultrasound array, 2) timing calculation to determine phase shifts for the ultrasonic transducers to produce a three dimensional shape, and 3) signal generation to compose electric signals to feed the ultrasonic transducers. The hardware subsystem 200 has a signal amplifier to produce the intended intensity for the tactile stimulation and a driver circuit that feeds the synchronized control signals to the ultrasonic transducer array. The ultrasonic transducer array can be configured by physical dimension (e.g., a single dimensional array or a two dimensional array) and layout (such as linear, circular, random layout, etc.).

As seen in FIG. 2, the software subsystem 100 has three components: a Graphical User Interface (GUI) 110, a 3D Point Cloud Representation (PCR) component 120 and a Focal Point Calculation (FPC) component 130. The GUI 110 is similar to a graphical authoring tool that provides the end user with a standard interface to create tactile objects that can be displayed using the Haptogram system (single point, 2D or 3D objects). The user would author/select from a list of existing tactile objects and load the corresponding PCR 120 representing the selected object into a field-programmable gate array (FPGA) circuit for execution. A snapshot of the GUI is shown in FIG. 3.

The PCR component 120 calculates a finite set of points or 3D point cloud representations that approximate the authored shape. Each 3D point cloud representation includes a plurality of discrete points that correspond to a single point, a two dimensional object or a three dimensional object. The PCR component 120 calculates two hundred discrete points that approximate the authored shape, along with the order at which these discrete points must be displayed. Each discrete point is represented by 3D coordinate (x,y,z) and is sent to the FPC component 130. The user can select a desired single point, two dimensional object or three dimensional object, and the discrete points of the 3D point cloud representation corresponding to the selected single point, two dimensional object or three dimensional object are projected into three dimensional space to produce tactile stimulation of the selected object.

The FPC component 130 calculates the distances between each focal point and the transducers, and the stimulation timings/intervals of each transducer to produce the focal point at the desired (x,y,z) location. Each transducer is controlled by a separate control signal. The FPC component 130 stores the results in a hexadecimal file that is loaded into the primary memory of the FPGA controller.

The hardware subsystem is made up of three components: the field-programmable gate array (FPGA) Controller 210, the Driver Circuit Amplification (DCA) component 220 and the Ultrasound Array (UA) 230. The FPGA Controller 210 produces synchronized pulse signals that feed into the DCA 220. The DCA component 220 is basically an amplifier circuit that produces enough power to stimulate the ultrasound transducers. Finally, the UA 230 is a composition of tile units comprised of two-dimensional arrays of ultrasound transducers that are expandable to increase a device workspace and an intensity of tactile stimulation. Each tile unit generates the focal point of compressed pressure at the desired 3D location in a workspace on top of the UA 230. The two dimensional array of ultrasonic transducers may be stationary and located on a table (for example). The ultrasonic transducers are actuated to produce a focal point of concentrated pressure at a specific point in 3D space. The specific point in 3D space may be located about 15 to 25 cm above the array, but may also be located at a point further away or closer depending on the configuration of the ultrasonic transducers.

FPGA Design

Figure 4:
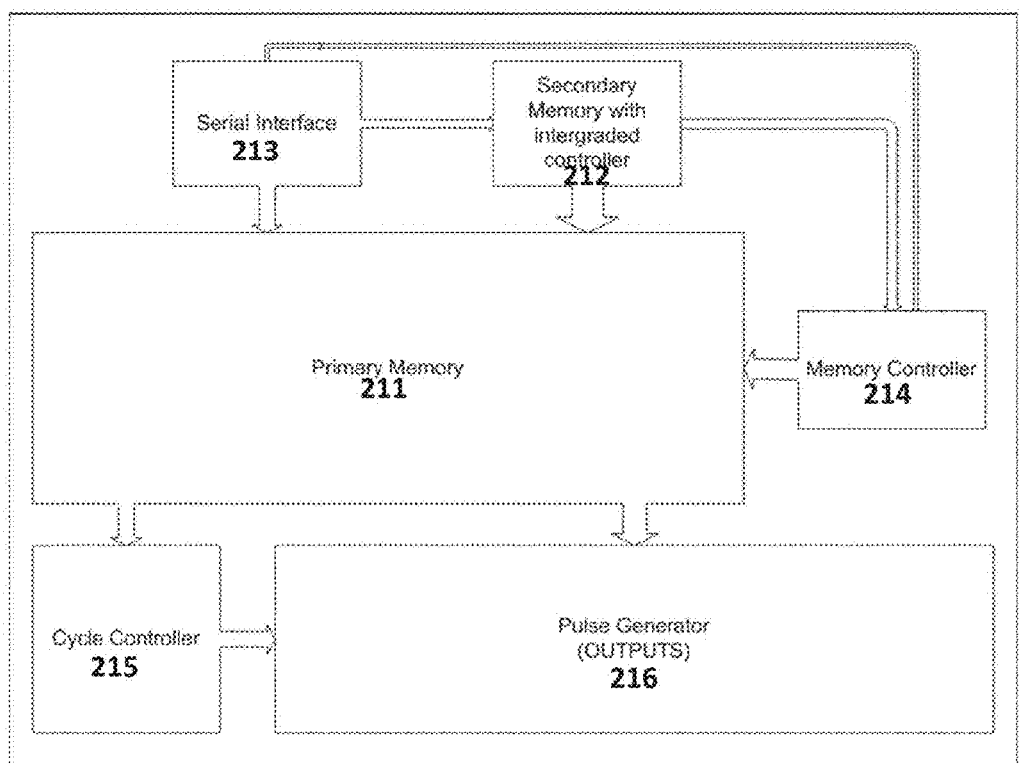
FIG. 4 is a field-programmable gate array (FPGA) block diagram design of the Haptogram system of FIG. 1.

The FPGA 210 design, shown in FIG. 4, includes six basic sub-designs: The primary memory 211, the secondary memory 212 (also referred to as a sequence memory), the serial interface 213 (also referred to as a UART port), the memory controller 214, the cycle controller 215 and the pulse generator 216.

All the information needed to form a plurality of focal points is stored to the primary memory 211. For example, the primary memory 211 may store information needed to form up to two hundred focal points. However, the primary memory 211 may store information needed to form any number of focal points, depending on the available memory of the FPGA board, the processing power, etc. The details of each focal point includes: the timing queues for each transducer (e.g., 100 16-bit numbers in total), the cycle length (e.g., period of the pulse, 24-bit), the pulse length (e.g., 8-bit) and a pre-scalar clock divider (e.g., 24-bit) value. The timing queue defines when to switch the transducer on/off in reference to the clock. In the example including 200 focal points, the cycle length defines the duration for which the entire 200 focal points must be displayed (one cycle is a display for the 200 focal points). The pulse length is the duration of the pulse that contributes to the stimulation of one focal point. The clock divider scales the timings to provide a wide range of tactile stimulation frequencies (e.g., ranging from 10 Hz to 5 KHz, 40 Hz to 5 KHz, 40 Hz to 800 Hz, or 125 Hz to 300 Hz). The total sum of 16-bit words is 106 (there are 40 dummy bits which are discarded). The memory data is accessed via a script that is developed for this purpose (called Tool Command Language or TCL script), through the JTAG interface.

In the secondary memory 212 a sequence of index numbers between 1 and 200 is stored. The secondary memory 212 drives the primary memory 211 by using these index numbers to select the appropriate focal point that needs to be formed at a specific time.

The serial interface 213 is configured to drive the primary memory 211 and enable or disable the secondary memory 212. Each time the user wants to change a focal point, the user has to send, through the serial interface 213, an index number. For example, in the embodiment including two hundred focal points, each focal point is assigned an index number between 1 and 200. Other index numbers (e.g., 201 and above) may be used for control. For example, index number 224 (binary 11100000) may be used as a special code to activate or deactivate the secondary memory 212 (which implies that focal point data would be received through the serial port or retrieved from the secondary memory 212).

The memory controller 214 controls the primary memory 211. The memory controller 214 extracts all the needed information out of the primary memory 211 in order to form a single focal point. All the extracted data are loaded to the cycle controller 215 and the pulse generator 216.

The cycle controller 215 determines the width of the period of the pulse and drives a 24-bit counter with it. The counter output is then fed to the pulse generator 216 and used to produce the appropriate pulses. The cycle controller 215 is also driven by the repeat input, which dictates the system to perform just once or continuously.

Figure 24:
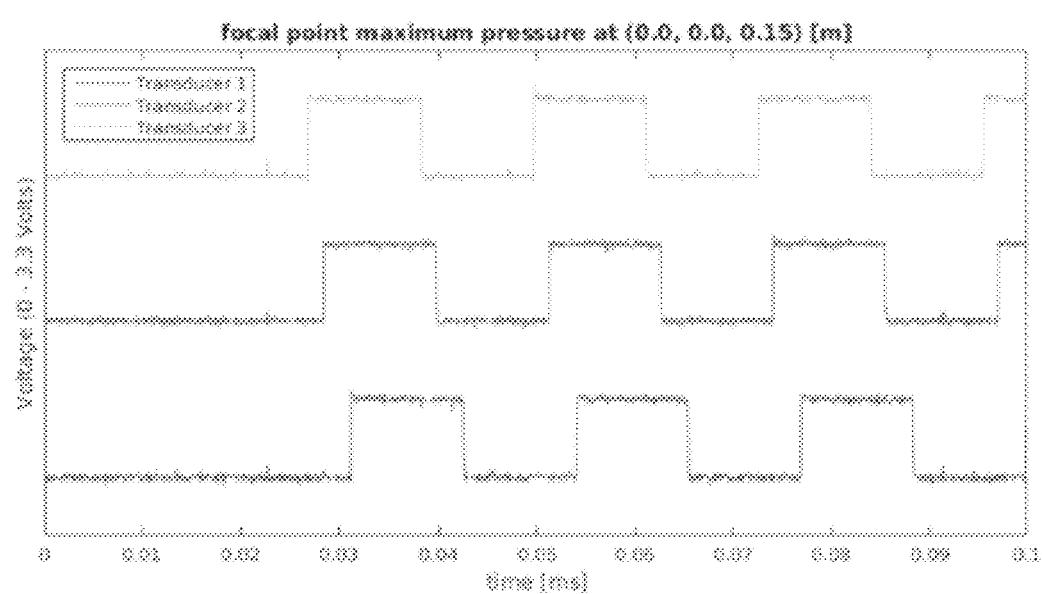
FIG. 24 illustrates an example of a pulse generator output voltage waveform.

The pulse generator 216 is the most important sub-design of the FPGA 210. In this design, all the appropriate pulses are produced to create the desired focal point. The data from the primary memory 211 and from the cycle controller 215 driven counter are fed to the pulse generator 216. The timing queue data provided by the primary memory 211 is compared in each time step with the cycle controller 215 driven counter value in such a way that the appropriate, separate, pulse for each transducer is generated at the appropriate time. Those pulses are finally fed to the transducer amplification circuit 240. An example of the voltage waveform for sample transducers is shown in FIG. 24. As illustrated in FIG. 24, there is a phase shift between successive transducers to achieve acoustic pressure at the focal point.

Amplification Circuit

Figure 5:
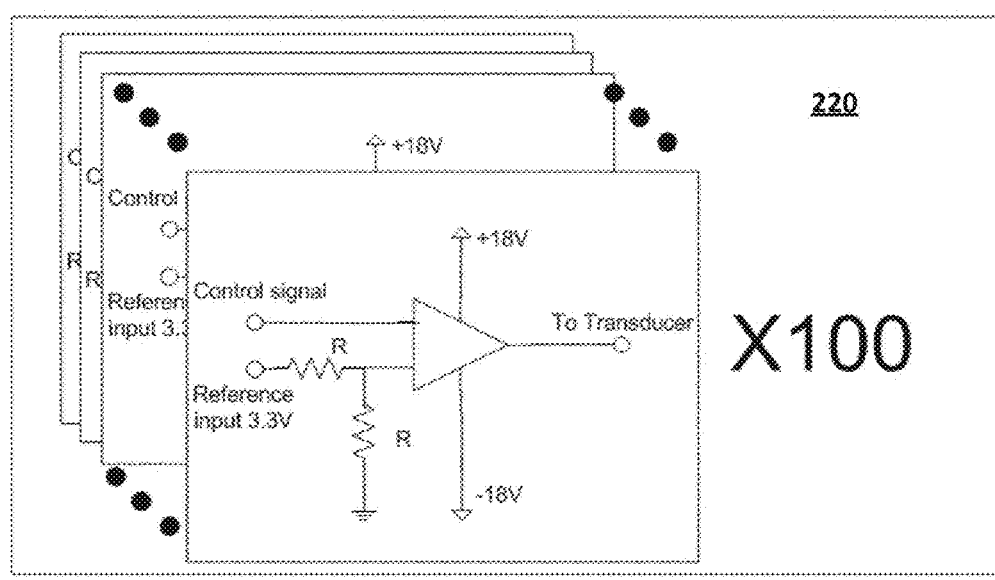
FIG. 5 is an ultrasound transducer amplification circuit of the Haptogram system of FIG. 1.

The FPGA controller 210 produces the pulses needed for the transducer array to form the desired focal points. However, before those pulses are fed to the array, they have to be driven through an amplification circuit 240 that guarantees maximum power of the produced ultrasonic waves to produce tangible tactile sensation at the desired focal point. Each pulse (e.g., out of the 100) is driven to the non-inverting input of an Op-Amp, which is configured as a voltage comparator 241, as shown in the circuit schematics of FIG. 5. A reference voltage is fed to the inverting input of the Op-Amp 241. The maximum voltage supply of the Op-Amp 241 is ±20 Volts. When the signal in the non-inverting input is less than the reference voltage, the output of the Op-Amp 241 drops to negative power supply (e.g., −20V). When the signal is for, example, 3.3 Volts in the non-inverting input, the output of the Op-Amp 241 rises to the positive power supply (+20V). The output from each Op-Amp 241 is then driven to the transducer array 230.

Ultrasonic Array

Figure 6B:
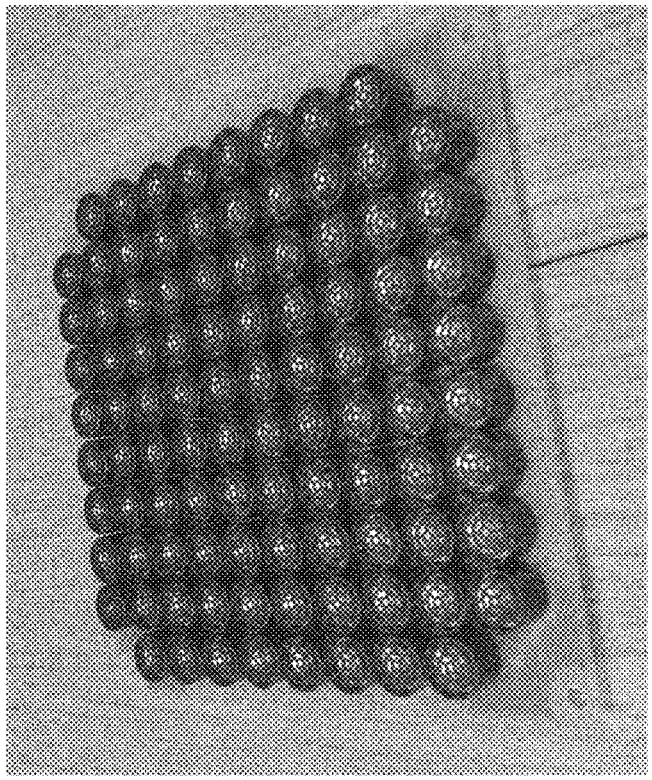
FIG. 6B is an isometric view of the tiled two-dimensional 10 by 10 array of ultrasound transducers of FIG. 6A
Figure 6A:
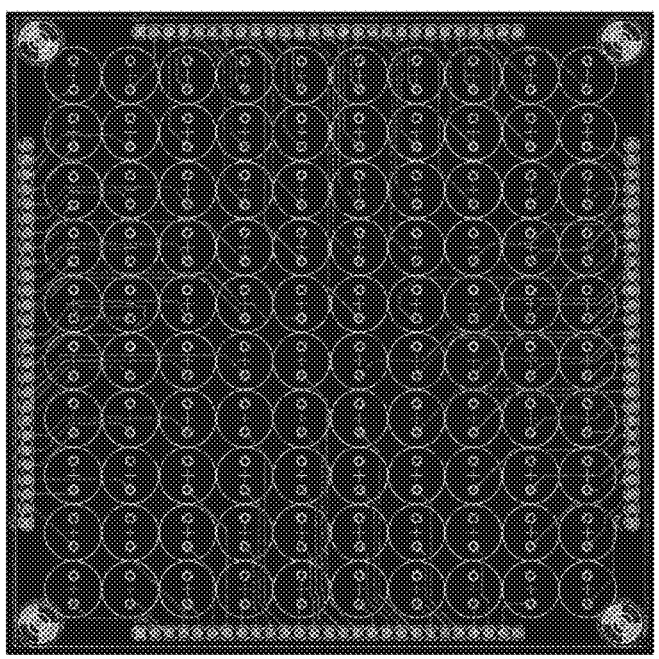
FIG. 6A is a top view of a schematic illustration of a single tile, two-dimensional 10 by 10 array of ultrasound transducers of the Haptogram system of FIG. 1.

The amplified signals are fed to a tiled two-dimensional array of ultrasound transducers 230. Each display tile, as shown in FIG. 6, is a 10 by 10 array of ultrasound transducers that connects to the central FPGA 210. In one embodiment, the MA40S4S 44 kHz Murata ultrasound transducer may be used in the Haptogram system. The software is designed to accommodate N number of tiles, as appropriately defined by the application. The more tiles the Haptogram system 1000 has, the larger the tactile display workspace. Furthermore, the intensity of the tactile stimulation increases as the number of display tiles increases.

Figure 7:
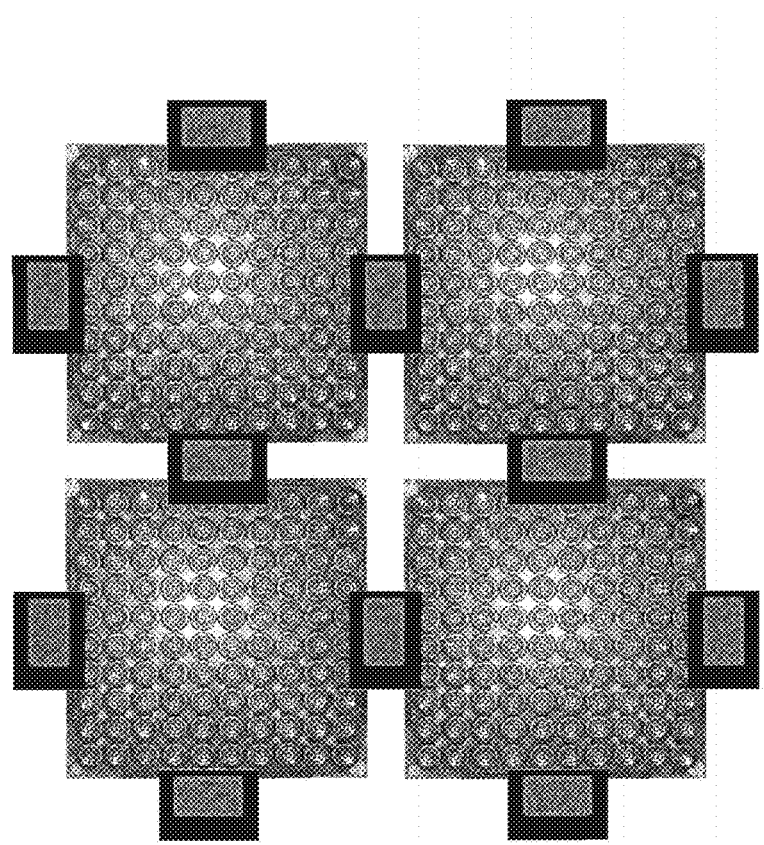
FIG. 7 is a tiled two-dimensional array design using the tiles of FIG. 6A.

The tiled two-dimensional array design, shown in FIG. 7, has several advantages. First of all, a tiled display can be arbitrarily scaled to extend the 3D tactile stimulation workspace. Secondly, a tiled display provides a flexible display apparatus, increases tactile stimulation intensity, reduces manufacturing difficulties and provides substrate space for wiring and control circuits on the display tile substrate (thereby improving system integration).

Focal-Point Calculation

Figure 8:
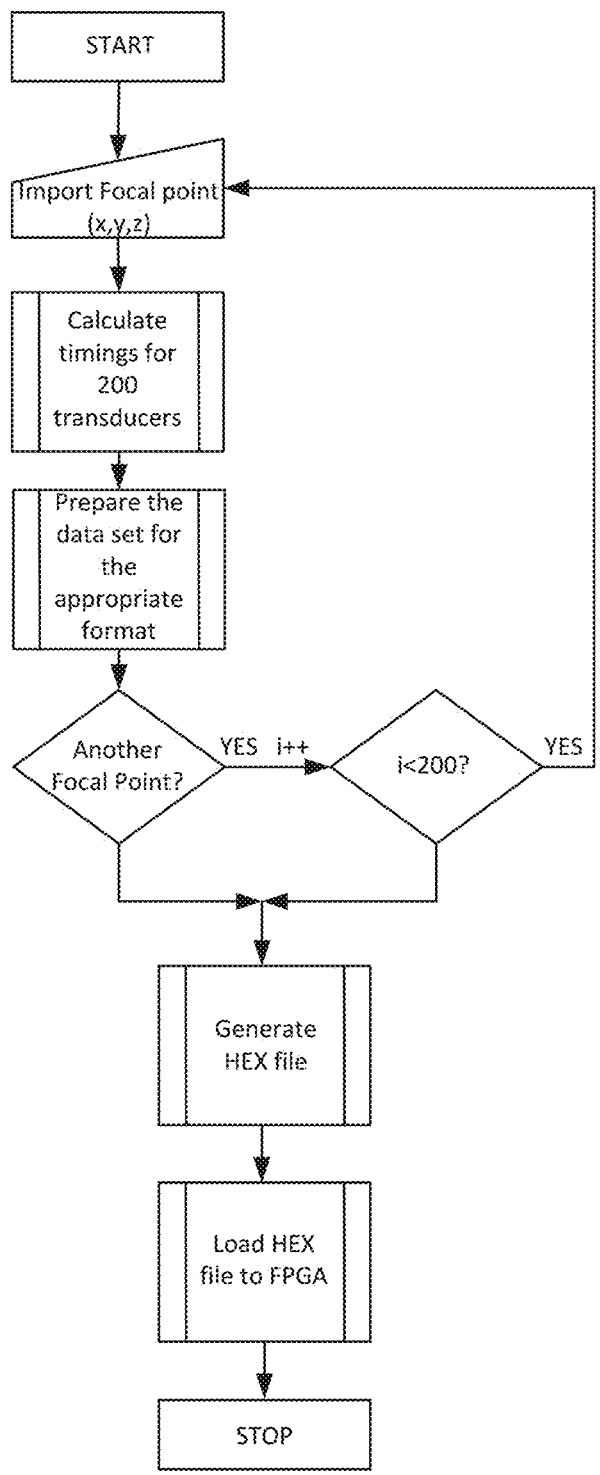
FIG. 8 is a flowchart for calculating a focal point using the Haptogram system of FIG. 1.

The software design consists of a basic function that calculates the timings that are necessary in order to form, at any given point, a focal point by the transducers array 230. This function accepts the coordinates of the desired focal point (x,y,z) and returns a list of distances between the given focal point and each transducer of the array 230. A flowchart that explains the focal point calculation is shown in FIG. 8.

Once the function is evaluated another function accepts this list and calculates all the timings needed by each transducer in order to produce ultrasound waves, which are in phase with all the ultrasound waves that are produced from the rest of the transducers for the given focal point.

These two functions can be called at most 200 times, which is the maximum data set that can be uploaded to the FPGA memory.

The outcome is a list of timing data for (at most) 200 focal points. This final list is fed to a function that converts the list to an appropriate hex file using a modified version (for 16 & 32 bit words) of a library called intelhex.

The last function of the basic script loads the hex file into the primary memory of the FPGA by calling the TLC script via the quartus_stp executable.

The basic script is the core of the application developed to control the ultrasound array. The TLC script is the interface script between the software and the FPGA design. The TLC script drives the quartus_stp.exe that can edit the memory contents of the Altera FPGA via the JTAG programmer. The TLC script can also edit constants that are hardcoded in the FPGA fabric. This TLC script uploads the hex files to the FPGA memory and it is also used for debugging and controlling the FPGA design by editing the constants. On the other hand, the secondary memory contains a series of numbers (0-200) and it is responsible of driving the primary memory. For example if a user loads the sequence 1-2-3-4 fifty times (1-2-3-4-1-2-3-4- . . . 1-2-3-4) then the primary memory will form only the first four focal points for fifty times according to the sequence.

Tactile Rendering

Given the FPGA controller runs at a frequency $f_P$, the number of clock cycles needed to prepare the actuation signal for switching focal points is C and the frequency of ultrasound waves is $f_U$, the time required to produce a focal point is $$\frac{1}{f_U} + \frac{c}{f_P}.$$

However, additional time is needed for all transducers to contribute to the formation of the focal point to generate maximized pressure. The minimum number of pulses needed for all transducers to contribute to the formation of the focal point is denoted as β and is defined by equation (19), based on equation (13). β is an integer number. If the rendering frequency for the focal points is $f_R$, then the maximum number of focal points that can be generated to create a 2D/3D tactile object (V) is expressed in equation (21).

$$\beta = [f_U(\max \Delta t_{ij} - \min \Delta t_{ij})] \tag{19}$$

The total time needed to form maximized pressure at the focal point is given by equation (20).

$$T_f = \frac{\beta}{f_U} + \frac{c}{f_P} \tag{20}$$

Where $T_f$ is a critical for fast switching of focal points and is referred to as the Focal Point Formation (FPF) delay. This delay includes the time for the transducer to settle vibration amplitude since start of driving, dead time due to time of flight of the ultrasound wave, and propagation time. Given V as the number of focal points, the rendering frequency $f_R$ is defined as shown in equation (21).

$$V = \frac{\frac{1}{f_R}}{\frac{\beta}{f_U} + \frac{c}{f_P}} \tag{21}$$

Equation (21) demonstrates an inversely proportional relationship between the rendering frequency and the number of focal points. This implies that generating higher resolution tactile display requires an increase in the number of focal points to form the tactile object. This in turn results in lower rendering frequency (if maximum acoustic pressure per focal point is to be maintained where all transducers contribute to the focal point formation). On the other hand, in order to increase the rendering frequency of tactile objects, a decrease in the number of focal points (per object) is to be expected. It then becomes a user choice to pick the proper configurations of the Haptogram system to make specifications for a particular application.

In order to describe this relationship analytically, one implementation of the Haptogram system utilizes a 10×10 array of ultrasonic transducers with a resonance frequency $f_u=40$ kHz, C=108, and a processor clock $f_p=50$ MHz. Assuming that the center of the display workspace is at an elevation of 10 cm, equation (13) provides a calculation for $\Delta T=643$ μs. The minimum number of pulses for all transducers to contribute to the formation of a focal point is $\beta=26$, based on equation (19). Therefore the relationship between the rendering frequency $$V = \frac{10^3}{0.643 f_R}.$$

If a rendering frequency of 30 Hz is sufficient for a particular tactile display, then a total number of focal points of V=51 can be achieved while maintaining maximized acoustic pressure. A larger rendering frequency can still be achieved with the same number of focal points but with lower acoustic pressure. As long as humans perceive the generated acoustic pressure, such alterations remain valid system configurations.

Figure 25:
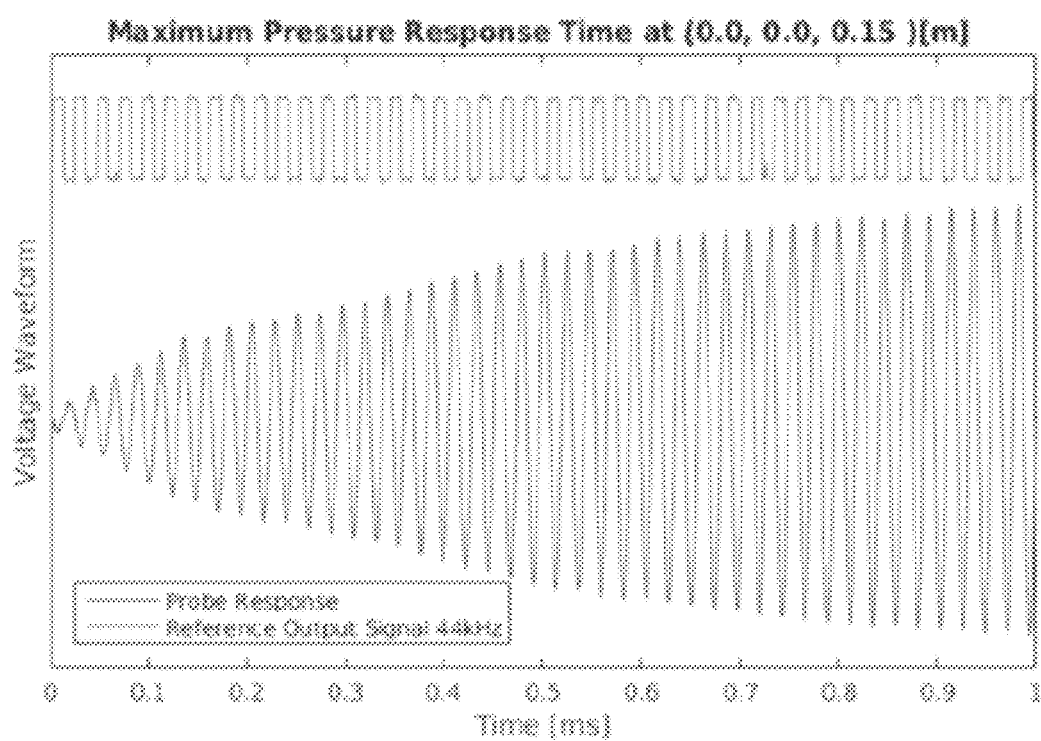
FIG. 25 illustrates a focal point formation delay in a voltage waveform measured by an ultrasound receiver probing for acoustic pressure at 15 cm elevation over time.

An experiment is conducted to measure the focal point formation delay using one implementation of the Haptogram system. An ultrasound receiver in used to measure the generated acoustic pressure at 15 cm elevation. FIG. 25 shows the voltage waveform measured by the ultrasound receiver probing for the acoustic pressure at 15 cm elevation over time. Considering the 90% rise time, the FPF delay is measured to be around 640 μs, which is consistent with the analytical result of 643 μs.

Performance Evaluation

The performance of the Haptogram system was evaluated to assess the effectiveness of tactile simulation using the Haptogram system. The analysis focused on the use of a single tile in the Haptogram display.

Figure 9:
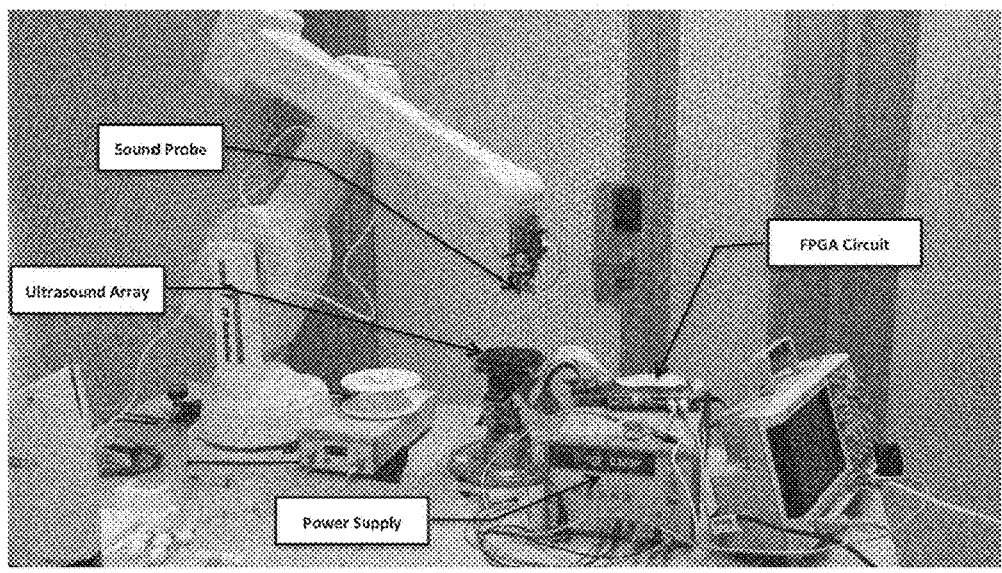
FIG. 9 is an experimental setup used to measure the spatial distribution of the acoustic radiation pressure of the Haptogram system of FIG. 1.

In order to measure the spatial distribution of the acoustic radiation pressure, the experimental setup shown in FIG. 9 was used. An ultrasonic sensor probe was attached to the end effector of the robotic arm (ST Robotics R17) whose resolution for movement was 0.1 mm.

The sound probe was a MA40S4S 44 kHz Murata ultrasound transducer. Its output was fed to AC-to-DC conversion circuit (to a rectifying bridge and then to an array of decoupling capacitors). Finally, the resulting DC signal (which represents the sound intensity) is fed to a 10-bit Analog to Digital Converter (ADC). The following configurations were also adopted in this experiment: a focal point diameter of 10 mm, the current was limited to 900 mA, the voltage is limited to ±12 V, and the modulation frequency is set to 500 Hz.

A simple script was developed to control the robotic arm to scan an adjustable 3D volume on top of the ultrasound array to measure the distribution of the acoustic radiation forces. Data were acquired at every 1 mm around the focal point in the case of single point stimulation and 2 mm for 2D and 3D shapes. At a general position, 20 measurements were taken at 1 ms intervals and the average is calculated and recorded as the force actuation at that position.

Single Point Tactile Stimulation

For the single point tactile stimulation scenario, the scan surface was adjusted with the following configuration: 50 mm by 50 mm, step size of 1 mm (giving a total of 2500 measurements for a single slice along the vertical axis). The robotic arm performed 10 slices of measurements along the vertical axis that are centered at the tactile stimulation point.

Figure 10:
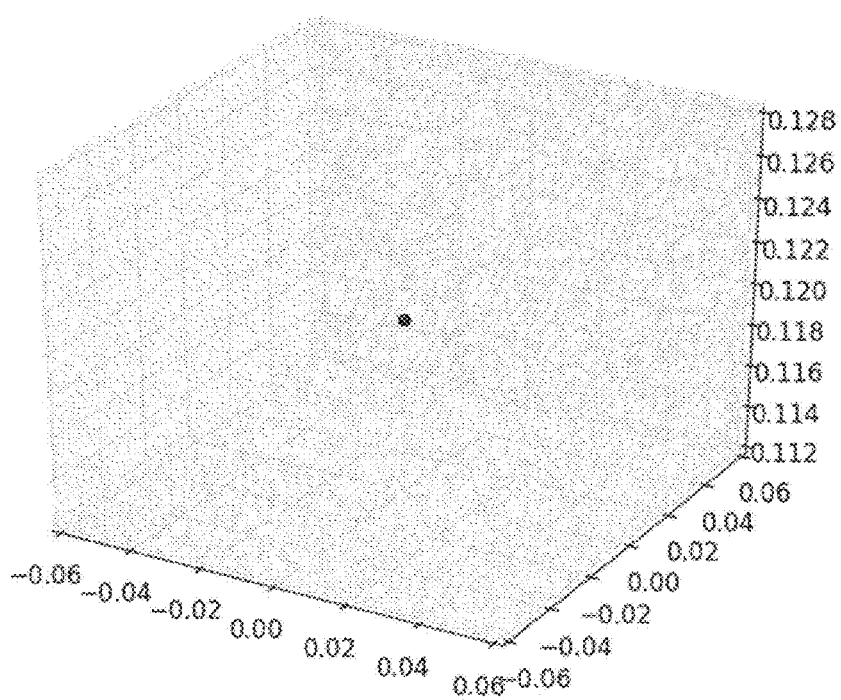
FIG. 10 illustrates the theoretical location of the single focal point stimulated at 12 cm elevation (scale in m).
Figure 11:
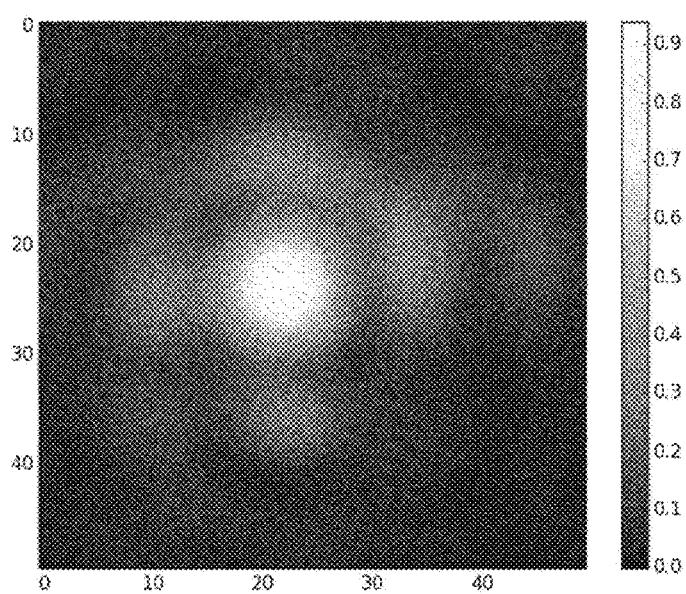
FIG. 11 illustrates the spatial distribution of the acoustic radiation force around a focal point that is generated at 13 cm elevation from the ultrasound array surface.

Since the force amplitude turned out to be time varying, the average values were recorded. FIG. 10 shows the theoretical location of the focal point. FIG. 11 shows the spatial distribution of the acoustic radiation force around a focal point that is generated at 13 cm elevation from the ultrasound array surface. The amplitude is normalized with a maximum force of 2.9 mN. As shown in FIG. 11, one focal point is surely generated and its diameter is about 10 mm. Note that side lobes around the main lobe are generated that are nearly symmetrical.

Figure 12:
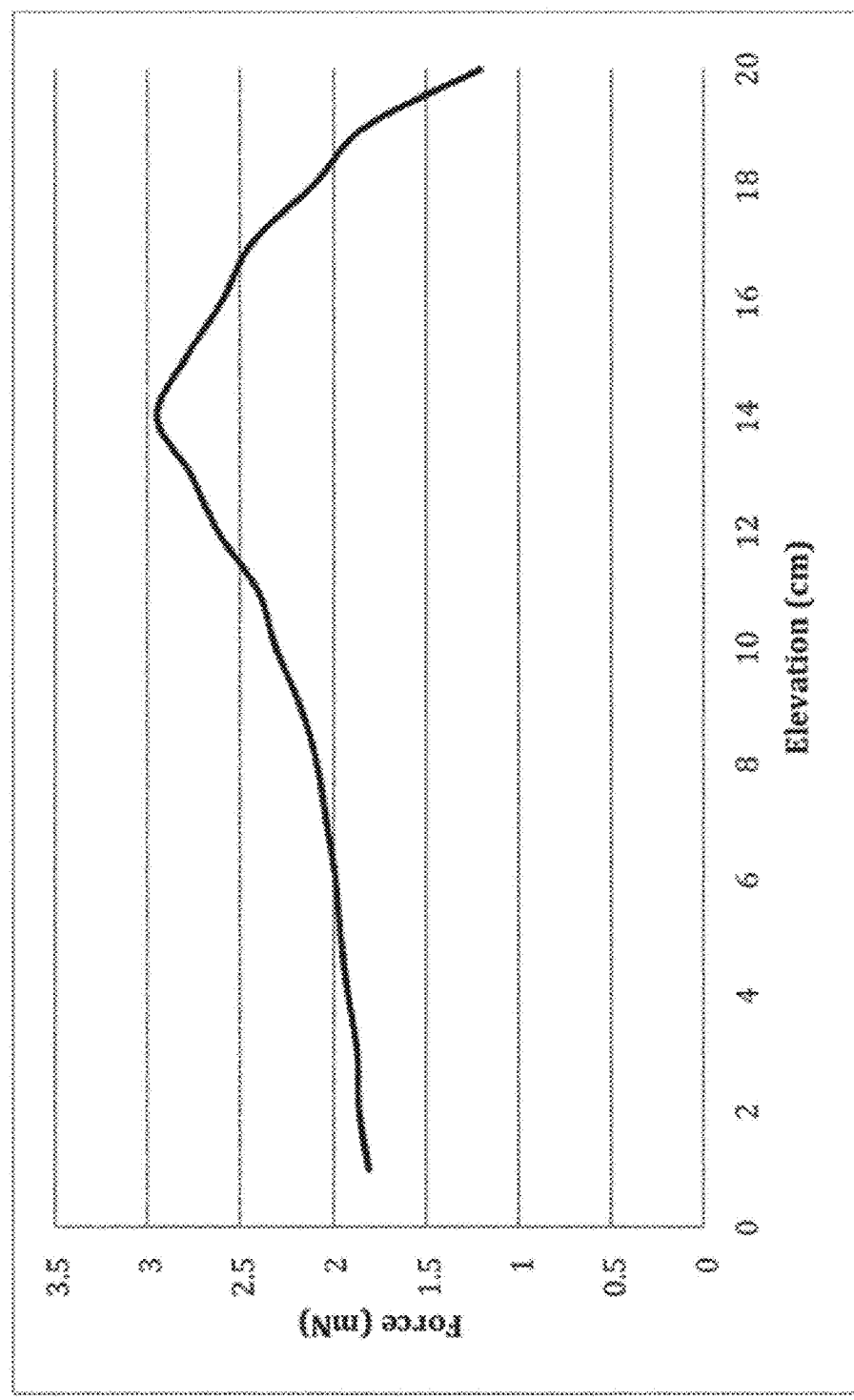
FIG. 12 is a graph illustrating the force versus distance for focal point stimulation for a series of focal points starting from an elevation of 8 cm up to 17 cm.

Another study was conducted to estimate the optimal elevation of the workspace for one tile of the Haptogram system. A series of focal points starting from an elevation of 8 cm up to 17 cm were projected and the corresponding force presented at each elevation was measured, with a step size of 1 cm. The results, as shown in FIG. 12, demonstrate that maximum forces (2.9 mN) are generated at an elevation close to 14 cm, which decreases as the elevation increases or decreases. This is justified by the fact that as the elevation increases (beyond 14 cm), the ultrasound signals experience higher attenuation, which results in lower perceived forces. On the other hand, as the elevation decreases below the 14 cm height, some transducers would have less contribution towards the formation of the focal point (due to limited directivity of the transducers). Therefore, it would be best to have the center of the device workspace for one tile at the 14 cm elevation since this will produce maximum tactile stimulation, and consequently result in better perception of the displayed tactile stimulus and higher quality of user experience.

2D Tactile Stimulation

For the 2D tactile stimulation, two 2D shapes, a straight line and a circle, were considered. The scan volume was adjusted with the following configuration: 100 mm by 100 mm, step size of 2 mm (giving a total of 2500 measurements for a single slice along the vertical axis). The robotic arm performed 10 slices of measurements along the vertical axis that are centered at the plane where the 2D shape was generated.

Figure 13:
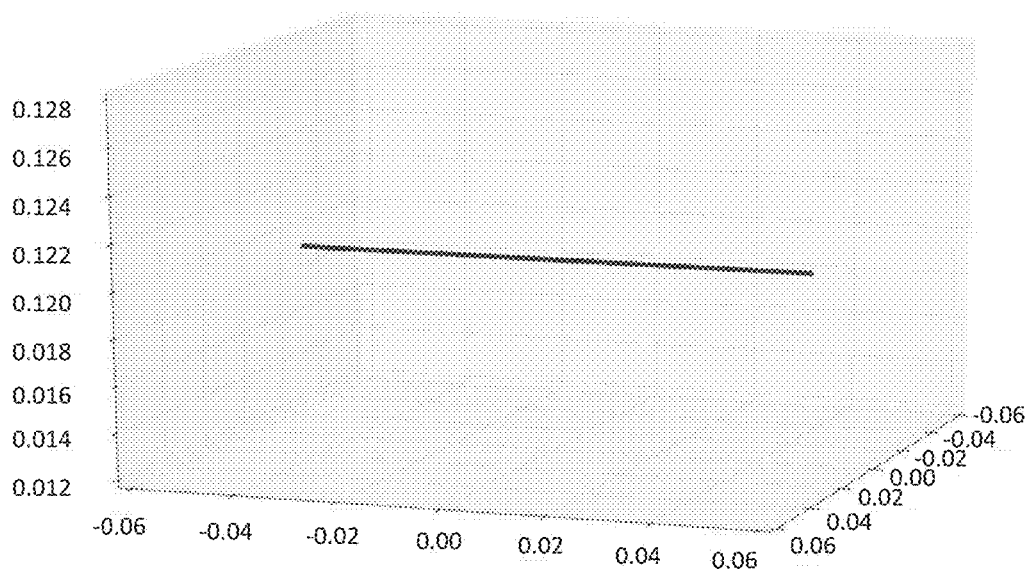
FIG. 13 illustrates a point cloud distribution of focal points for a straight line stimulated at 12 cm elevation (scale in m).
Figure 14:
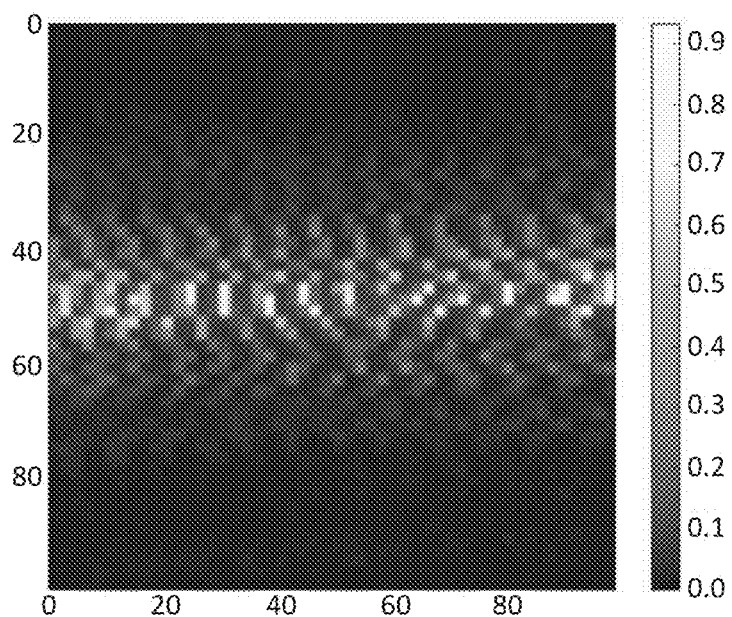
FIG. 14 illustrates the spatial distribution of the acoustic radiation force for the straight line of FIG. 13 that is generated at 12 cm elevation from the ultrasound array surface.
Figure 15:
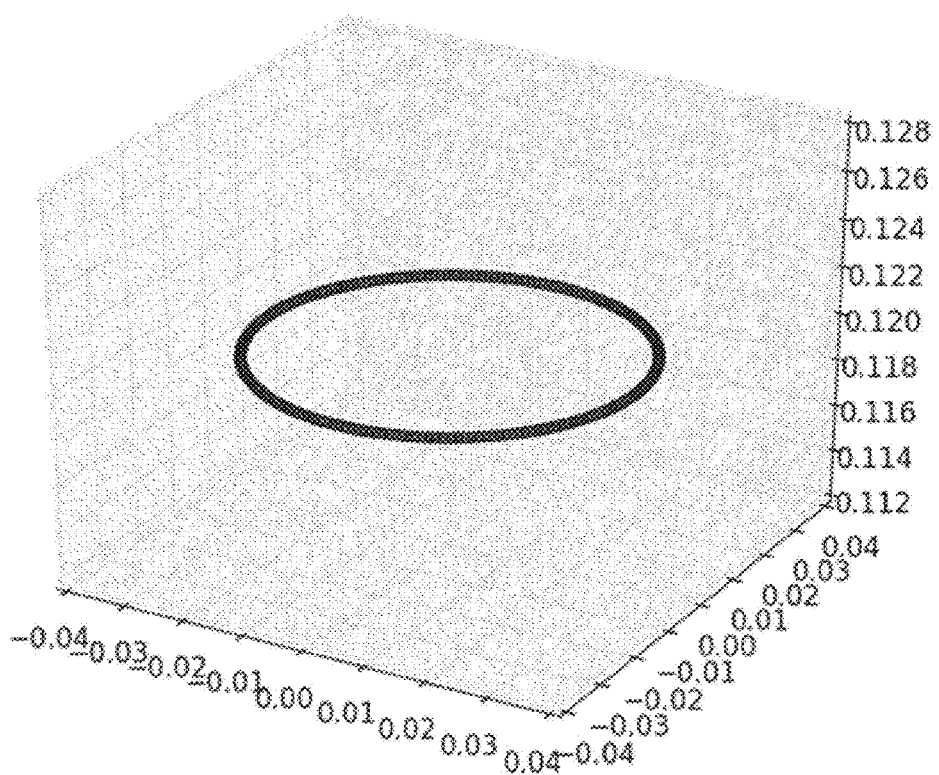
FIG. 15 illustrates a point cloud distribution of focal points for a circle stimulated at 12 cm elevation (scale in m).
Figure 16:
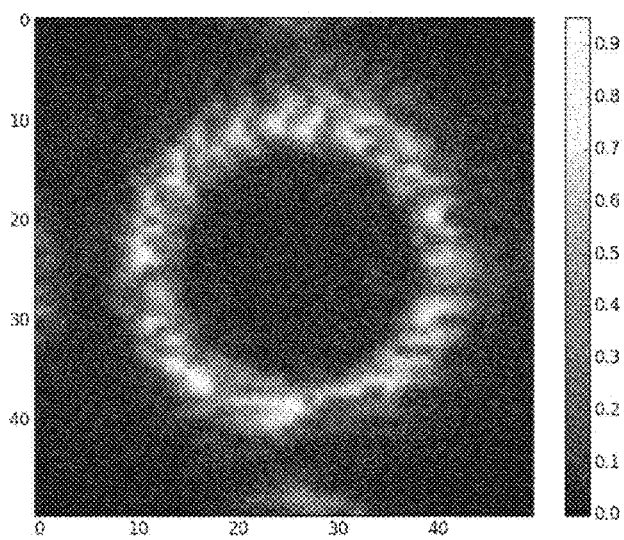
FIG. 16 illustrates the spatial distribution of the acoustic radiation force for the circle of FIG. 15 that is generated at 12 cm elevation from the ultrasound array surface.

FIG. 13 and FIG. 15 show the point cloud distribution of focal points for the straight line and circle shapes, respectively. FIG. 14 and FIG. 16 show the spatial distribution of the acoustic radiation force for the two 2D shapes (straight line and circle respectively) that are generated at 12 cm elevation from the ultrasound array surface. The amplitude is normalized with a maximum force of 2.9 mN. FIG. 14 shows a clear straight line centered along the y-axis and spread for 100 mm. As shown in FIG. 16, a circle is neatly generated and its diameter is about 70 mm. Note that side lobes around the main lobe are generated, in both cases, that are nearly symmetrical.

3D Tactile Stimulation

For the 3D tactile stimulation, a display of the upper half of a sphere whose center is located at 14 cm elevation, with a radius of 50 mm was considered. The scan volume was adjusted with the following configuration: 100 mm by 100 mm, step size of 2 mm (giving a total of 2500 measurements for a single slice making a horizontal plane). The robotic arm performed 20 slices of measurements along the vertical axis that started from height 14 cm up to 24 cm, with a step size of 5 mm between slices (a total of 20 slices).

Figure 17:
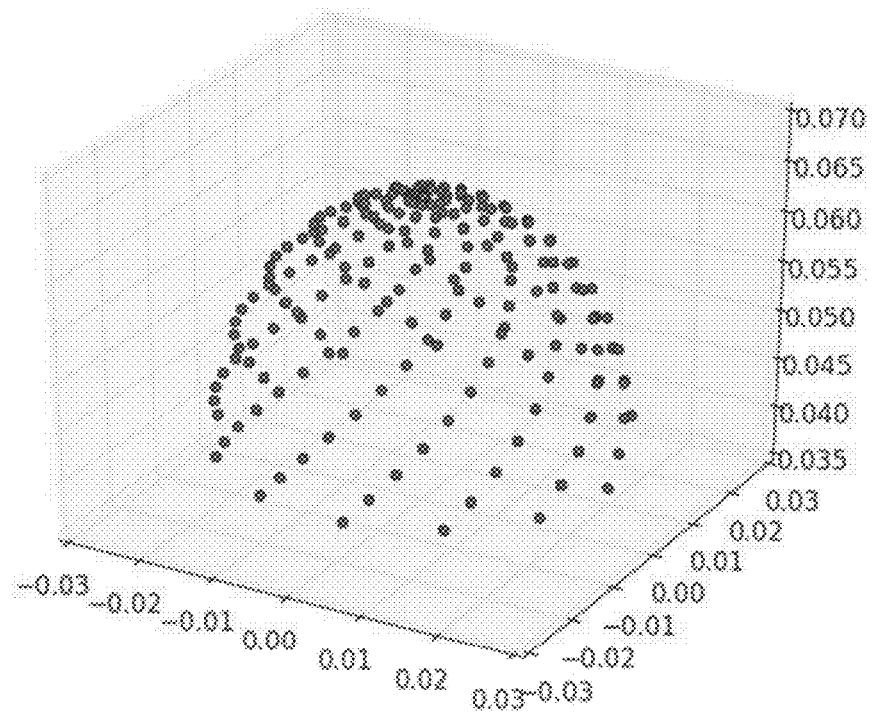
FIG. 17 illustrates a point cloud for a hemisphere object centered at 14 cm elevation (scale in m).
Figure 18:
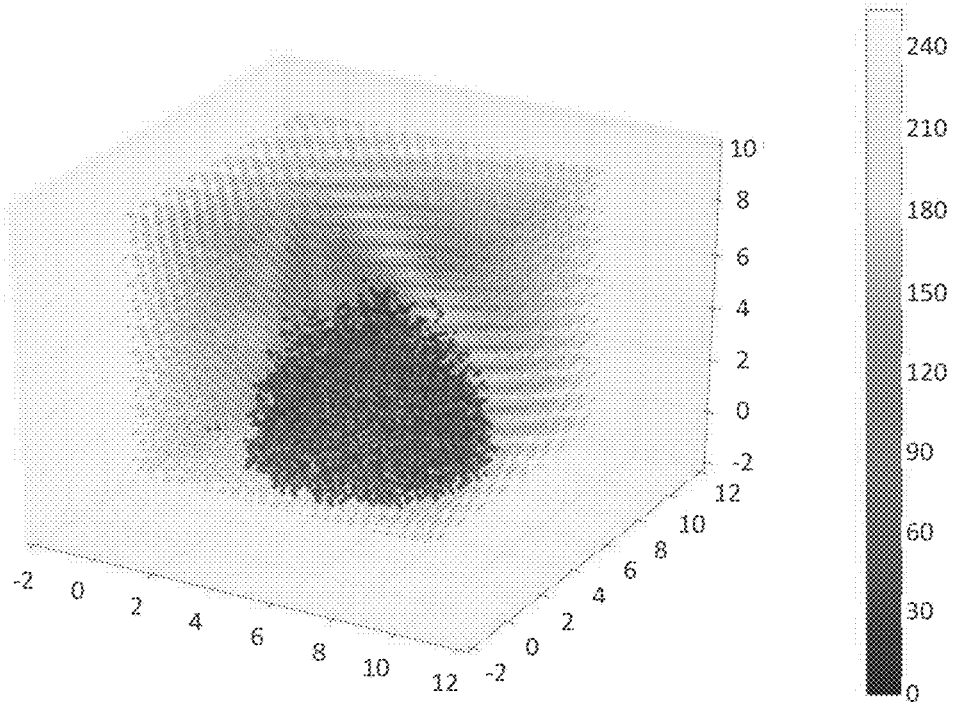
FIG. 18 illustrates the spatial distribution of the acoustic radiation force for the hemisphere object of FIG. 17 that is centered at 14 cm elevation from the ultrasound array surface.

FIG. 17 shows the point cloud for the hemisphere object. FIG. 18 shows the spatial distribution of the acoustic radiation force for the hemisphere object that is centered at 14 cm elevation from the ultrasound array surface. The plot in FIG. 18 is based on a threshold value of 2 mN (only forces above 2 mN are displayed to show the concentration of forces to form the 3D shape).

Simulation

A simulation experiment was conducted in order to confirm whether the generated acoustic radiation forces are sufficient for human perception of tactile sensation. For the simulation, the pressure field distribution and force calculations were computed using a fast object-oriented C++ ultrasound simulator library called FOCUS that works with MATLAB, which is executed by a processor or processing circuit. In other embodiments, a different program may be used including code from any suitable computer-programming language such as, but not limited to, C, C++, C#, Java, JavaScript, Perl, Python and Visual Basic.

Figure 19:
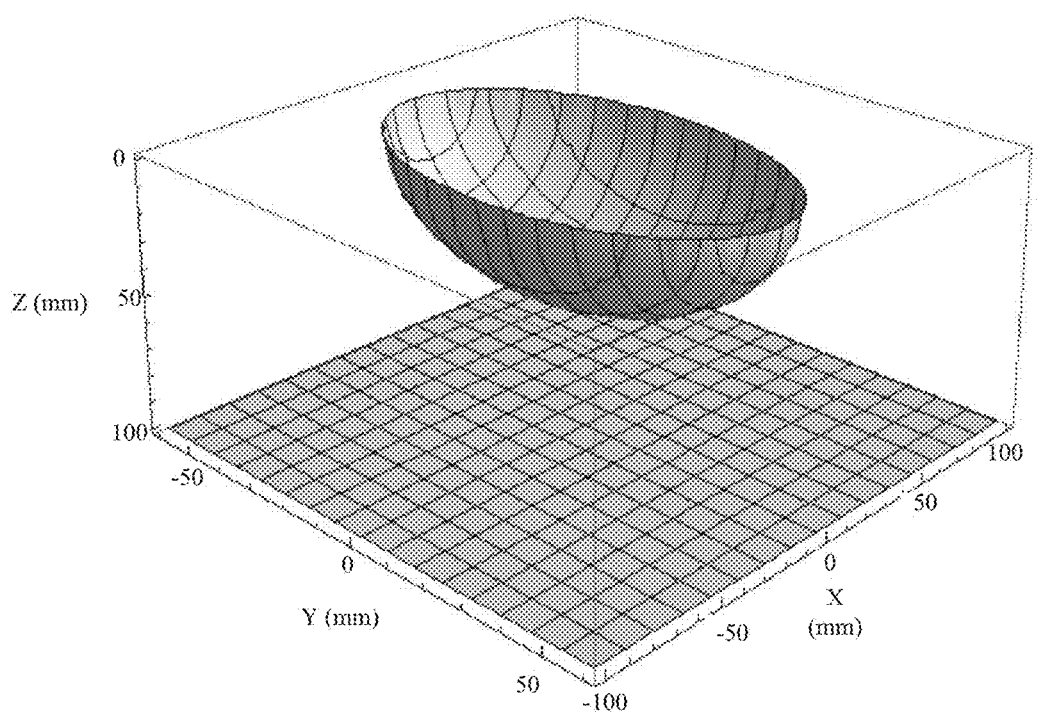
FIG. 19 is a simulation rendering of a 3D tactile object stimulation.

The 3D object used in this simulation was the lower half of a sphere located centered 100 mm above the transducer array with a radius of 50 mm. A graphical representation of the hemisphere is shown in FIG. 19. In one embodiment, the simulation may include 256 (16×16) transducers, but in other embodiments, the simulation may include another number of transducers in other configurations or arrangements. In the simulation, the transducer housing was square shaped with a side length of d=10 mm. The resonant frequency was 40 kHz, while the directivity is 80 deg. M×N (=16×16) transducers are used and arranged into a 180×180 mm² rectangle. The following parameters were used to run the simulations described below:

Frequency=40 kHz
$\beta$=1.15×10−1 Np/m
C=340 m/s
P0=8.59×10−3 Pa
Voltage=10 Vrms
K=$2\pi/\lambda$=730.603 rd/m
W=$2\pi f$
$\alpha$=2
Medium: an air interface (lossless)

One of ordinary skill in the art will appreciate that a lossless medium is the air interface. In one embodiment, an ultrasonic wave travels at a speed of 340 m/s. If the medium were not lossless (i.e., if the medium changed), the speed of the ultrasonic wave would change accordingly.

The frequency (e.g., 40 kHz) is the resonance frequency for the selected ultrasonic transducer. The frequency is a constant value based on the hardware transducer in use. Beta is the attenuation coefficient of an ultrasonic wave in air interface. Beta is also a constant. The speed of the ultrasonic wave (e.g., C=340 m/s) in the air interface. The speed of the ultrasonic wave is constant. P0 is the power density of the ultrasonic signal at the transducers array surface. P0 is calculated for z=0. Voltage (e.g., 10 Vrms), is the voltage applied to power the ultrasonic transducers. Typically, a recommended voltage is provided in the ultrasonic transducer's datasheet. K is the wavenumber of the ultrasonic wave. W is the angular frequency. $\alpha$ is a constant ranging from 1 to 2 depending on an amplitude reflection coefficient at an object surface. If the object surface perfectly reflects the incident ultrasound, $\alpha$=2, while if it absorbs the entire incident ultrasound, $\alpha$=1. Assuming that the human hand perfectly reflects the ultrasonic wave, $\alpha$=2 was selected for the experimental study.

Figure 20A:
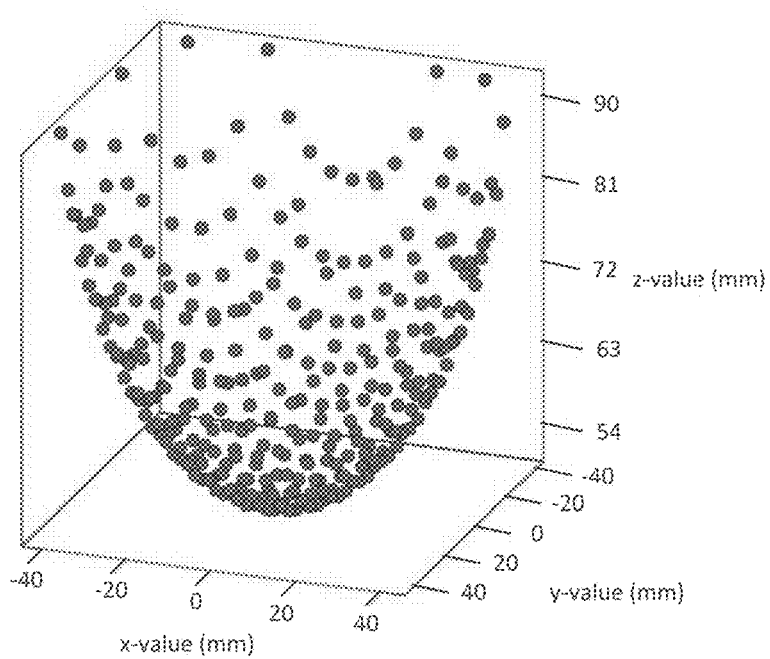
FIG. 20A is a simulation rendering of a 10 mm resolution tactile 3D object.
Figure 20B:
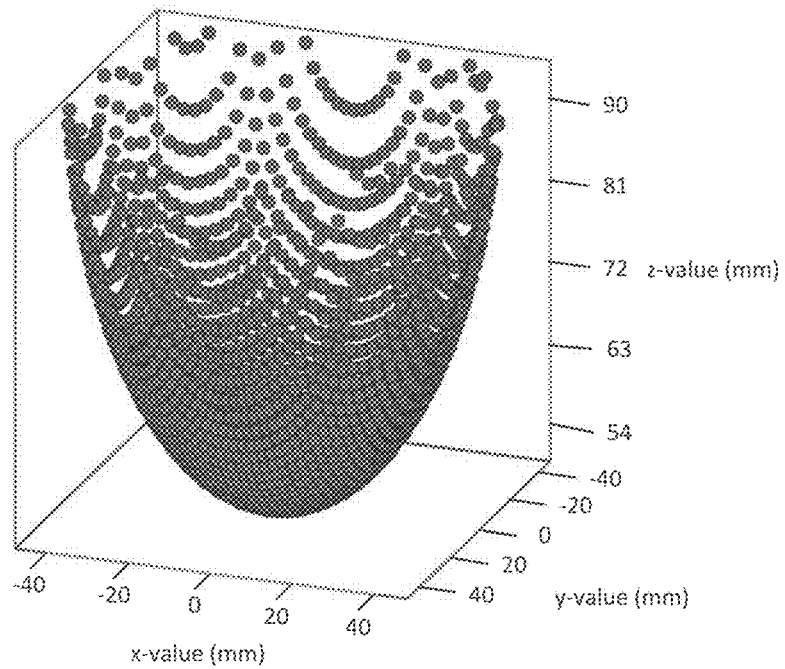
FIG. 20B is a simulation rendering of a 5 mm resolution tactile 3D object.
Figure 20C:
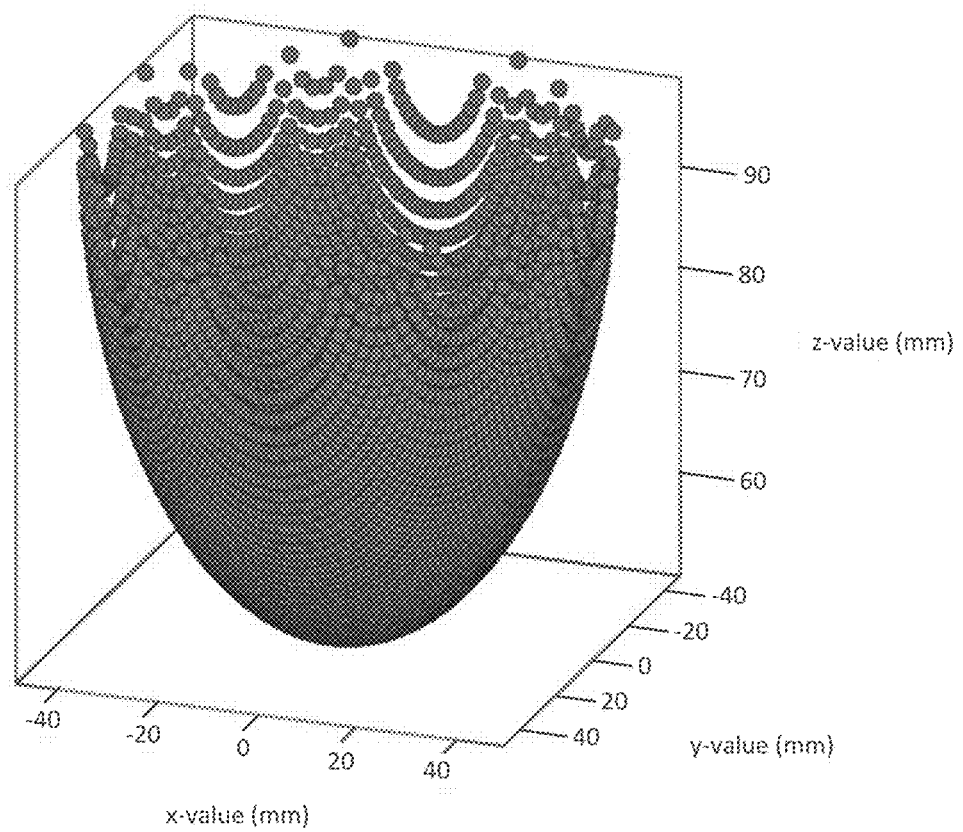
FIG. 20C is a simulation rendering of a 2 mm resolution tactile 3D object.

Another configuration parameter that can be controlled through the simulation is the resolution of tactile 3D object. FIGS. 20A, 20B, and 20C illustrate examples of low resolution (e.g., 10 mm) (see FIG. 20A), intermediate resolution (e.g., 5 mm) (see FIG. 20B), and high resolution (e.g., 2 mm) (see FIG. 20C) displays. Note that higher resolution display takes more time to display the entire 3D object, and thus, require faster hardware to implement. However a low resolution display might degrade the quality of user perception of 3D tactile sensation. Usability testing will be conducted in the future work to find the optimal tradeoff In the simulation, the following simulation loop was utilized:

```
% M, N dimensions of the array
% w and h are width and height of array
% s_x and s_y are x and y spacing
array = create_rect_array(M,N,w,h,s_x,s_y)
% Loop update rate 1 kHz
Loop
    %setup coordinate grid
    coord_grid = set_coordinate_grid(delta,
    xmin, xmax, ymin, ymax, zmin, zmax);
    % Calculate the next point coordinates
    point = getNextPoint (3D object)
    % focus the array to point
    array = get_focus_phase (array, point,)
    % calculate pressure field
    p = pressure(array, coord_grid, freq,)
Repeat Loop
```

Initially, the geometry of the transducer array was setup with the following dimensions for each transducer (width=1 mm, height=5 mm, edge-to-edge spacing—s_x and s_y=0.5 mm). These values were selected to maximize the density of ultrasound transducers in the array. Other values may be used (other researchers have tried random distribution of the transducers spacing. See Gavrilov, L. R. "The Possibility of Generating Focal Regions of Complex Configurations in Application to the Problems of Stimulation of Human Receptor Structures by Focused Ultrasound," Acoustical Physics, Vol. 54, No. 2, pp. 269-278 (2008).

Figure 21:
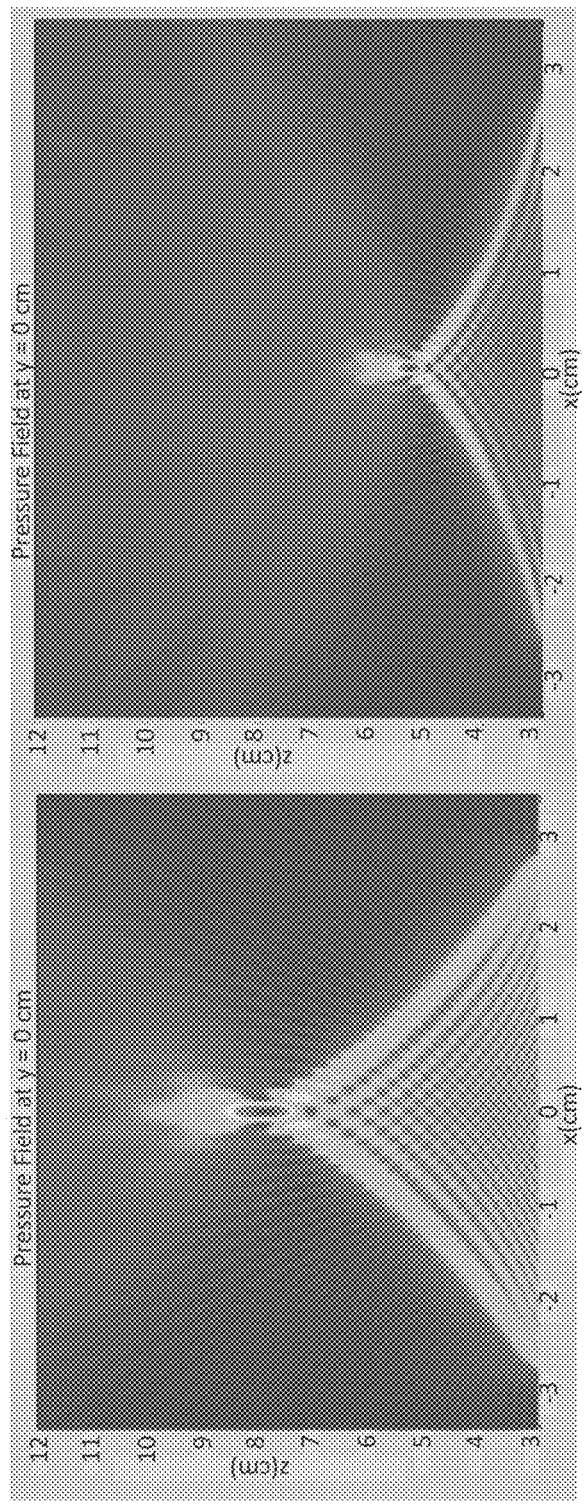
FIG. 21 is a simulation rendering of desired tactile feeling points.

Next a loop that runs at 1 kHz rate was executed. The loop starts by setting up the coordinate grid to cover the full width of the transducer array in the x direction and to measure the pressure field in the z direction. Then the coordinates of the next point on the 3D model are retried and used to generate a focal point at the desired point and hold on for specific time. FIG. 21 shows a simulation that demonstrates the ability of ultrasonic transducers to stimulate tactile feeling at a desired point in 3D space.

Table 1 shows simulation results for a combination of 16 different configurations with four resolution levels of display and four layout configurations.

TABLE 1

| Ultrasound | 20% Resolution (2 cm) | | 10% Resolution (1 cm) | | 5% Resolution (0.5 cm) | | 2% Resolution (0.2 cm) | |
|---|---|---|---|---|---|---|---|---|
| Array Configuration | Avg (mN) | Std Dev. (mN) | Avg (mN) | Std Dev (mN) | Avg (mN) | Std Dev (mN) | Avg (mN) | Std Dev (mN) |
| 128X1 | 3.30 | 0.38 | 3.17 | 0.41 | 3.14 | 0.46 | 3.04 | 0.54 |
| 64X2 | 3.90 | 0.96 | 3.85 | 0.94 | 3.78 | 0.83 | 3.70 | 0.76 |
| 32X4 | 4.33 | 0.67 | 4.24 | 0.62 | 4.07 | 0.53 | 3.83 | 0.38 |
| 16X8 | 4.33 | 0.97 | 3.96 | 0.88 | 3.89 | 0.66 | 3.62 | 0.34 |

The forces were calculated by utilizing Equation (8) with a cubic unit of 1 mm$^3$. The results of the simulation showed:
1. In all the considered configurations, the average force ranged from 4 mN to around 3.5 mN (while standard deviation ranged from 0.75 mN to 0.5 mN). According to several haptic studies, this force is comfortably capable of stimulating tactile sensations on the human skin.
2. The higher the display resolution, the smaller the average forces were. However, the standard deviation of forces mostly decreased with an increase in the display resolution. This implies that even though higher variations of displayed forces were experienced, the average forces decreased. This means that the average forces have decreased as the resolution of the displayed object increases. The standard deviation for the display forces has also increased. Force variations may impact the quality of a user's experience. Usability testing will be conducted to investigate and document the quality of experience associated with the embodiments of the present application. A well-documented property (called Just-Noticeable-Difference JND) is known in the literature for tactile stimulation. The JND may vary based on the tactile stimulation technology used to generate the forces, as well as the part of the body where the stimulation is applied (i.e., parts of human body are more sensitive for tactile sensation than other parts of the human body).
3. The average force increased from a one-dimensional configuration (1×128) to a two-dimensional configuration (8×16), with the same total number of ultrasonic transducers. This implies that using a two dimensional array of ultrasonic transducers increased the ultrasound forces. However, higher discrepancies in the magnitude of generated forces were experienced.

The simulation results showed that the proposed system is capable of generating forces that are within comfortable margins of forces that are perceived by the human skin. Furthermore, the three dimensional tactile feedback system is capable of generating a sequence of tactile points (that altogether construct a hemisphere in the simulation described above) at a 1 kHz update rate.

Comparison with Simulation Results

A similar simulation analysis was conducted to compare the experimental results for various tactile objects with the simulation results. The following parameters were used to run this simulation: frequency=40 kHz, $\beta=1.15\times10-1$ Np/m, C=340 m/s, $P_0=8.59\times10^{-3}$ Pa, voltage=±12 Volts, K=2π/λ=730.603 rd/m, W=2πf, α=2, and the simulated medium was the air interface (lossless).

Table 2 summarizes the comparison between experimental and simulation results for four different shapes: a single point, a straight line, a circle and a hemisphere.

TABLE 2

| | Simulation | | Experimental | |
|---|---|---|---|---|
| Shapes | Average (mN) | Standard Deviation | Average (mN) | Standard Deviation |
| Single Point | 2.84 | 0.11 | 2.77 | 0.12 |
| Straight line | 2.71 | 0.18 | 2.68 | 0.2 |
| Circle | 2.69 | 0.18 | 2.65 | 0.19 |
| Hemisphere | 2.61 | 0.22 | 2.66 | 0.24 |

For a single point of tactile stimulation, the average tactile force generated is the highest compared to the other objects whereas the standard deviation is the least. This is explained by the fact that producing a single point of tactile stimulation involved minimum interferences (especially those due to switching from one focal point to another). It was observed that 3D objects have the least average tactile stimulation and highest standard deviation since interferences are higher in this case. In all cases, it is clear that all forces (simulation or experimental) are way above what the human skin can perceive and thus the Haptogram system can be used as a haptic display interface.

Discussion

The experimental analysis has clearly demonstrated the ability of Haptogram system to generate perceivable tactile objects (single point, 2D shapes and 3D shapes). One tile of the Haptogram display was able to generate an average force of 2.65 mN (standard deviation of 0.2 mN) for the 200 focal points that make up the 3D shape, over an elevation range of 8 cm to 18 cm.

The Haptogram system has several advantages as a tactile display. First of all, it does not provide an undesirable tactile feeling originating from the contact between the device and the skin because the device is contactless. Second, the temporal bandwidth is broad enough to produce 3D tactile feelings by generating a series of tactile focal points and switching between them at a high speed. The current implementation breaks down any 3D object into a maximum of 200 focal points.

An audible sound is heard when the Haptogram system is turned on. The audible sound may be loud such that it can be heard within several meters from the display and it can be annoying for some users. Headphones for ear protection can be used to prevent the user from hearing the audible sound. There are two sources of the audible sound. One is the envelope of the ultrasound. If 500-Hz modulation is used, the 500 Hz audible sound is produced due to the nonlinearity of air, which is a phenomenon utilized in a directive loudspeaker. The other cause would be the discontinuity of the phases of the driving signals when the position of the focal point is changed. The inventors believe that the former source of the audible sound is the dominant one.

There might have been few sources of errors while taking measurements via the robotic arm. First of all, the surface of the ultrasound array and the scanning surface of the robotic arm may not be perfectly parallel. This implies that there might be some errors measuring forces at a particular horizontal slices due to a skewed measurements. Secondly, the sound probe attached to the robotic arm is an ultrasound transducer that is not perfectly sensitive to the measurement of forces. Another source of error may have occurred due to additional reflection noises as the robotic arm came closer to the surface of the two-dimensional array of ultrasound transducers.

Usability Study

Figure 26:
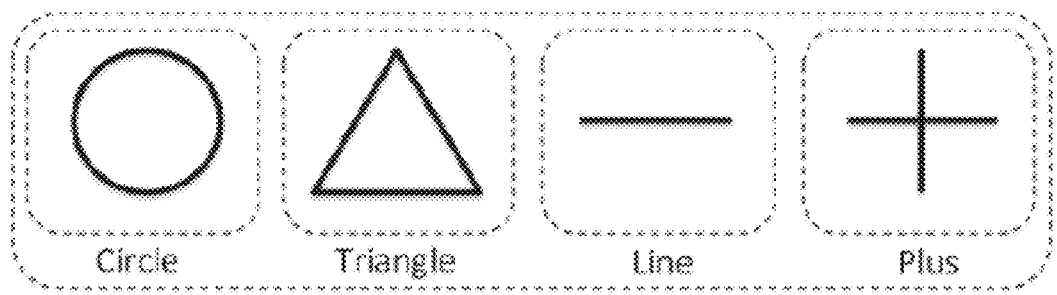
FIG. 26 illustrates four 2D shapes (circle, triangle, line, and plus sign) utilized in a usability study to investigate how well users perceive animated 2D shapes displayed by the Haptogram system.

A usability study was conducted to investigate how well users can perceive animated 2D shapes displayed by the Haptogram system. Although 3D shapes can be presented, the usability study was limited to 2D objects. As seen in FIG. 26, four 2D shapes were considered: circle, triangle, line and a plus sign (also referred to as a cross). The shapes were randomly selected and displayed in a square of 10 cm by 10 cm workspace with a precision of 1 mm. Users were asked to feel the tactile stimulation through his or her palm. The users were also given noise cancellation headphones to eliminate acoustic noise generated by the system or any other auditory source that may distract the user from recognizing the tactile shape.

The following configurations were used for tactile stimulation: the rendering frequency was set to 10 Hz, while the number of focal points was set to 200. The shapes stimuli were displayed in a random order to reduce the bias and ordering effects as much as possible. For each trial, the recognition rate and the recognition time were measured. The recognition rate was defined as the ratio of accurately identifying a displayed shape over the total number of trials. The recognition time was defined as the average time it took the user to recognize a particular shape correctly. The experiment was divided into two blocks of 12 trials for each block, giving participants time to rest from a trial to the next.

A one-tile Haptogram prototype (10×10 transducers) was used in this experiment. The experiment software was running on a desktop PC equipped with an Dual Six CoreXEON E5-2630, 2.3G Hz processor and 32 GB RAM. A hand-resting stand was designed specifically for this experiment. Active noise-cancelling headphones were used to cancel out the auditory noise.

Fifteen (15) adult subjects were participated in the experiment; 8 male, 7 female, average age of 26 years (standard deviation was 6.60 years). By self-reporting, none of the subjects had any deficiency in their ability to touch. Users were allowed a training session for as much as they desire to familiarize themselves with the system and the stimuli before completing the experiment. In total, we collected 360 trials (15 participants×2 sessions×12 trials per session).

The experimental task required users to recognize one of the four 2D shapes by holding their hands on top of the Haptogram display. The elevation of tactile stimulation was fixed since the user was asked to rest his/her palm on a stand tuned at 13 cm elevation (the elevation at which the shapes are generated). No audiovisual cues about the displayed 2D shapes were given to the participants. Each trial started when the participant hit the return button of the keyboard in front of them. Participants were instructed to feel tactile shapes on his/her palm and respond as fast and accurate as possible. The participant responded by keying a corresponding number (1 for circle, 2 for plus sign, 3 for line, and 4 for triangle). Each shape was displayed continuously for a maximum of 30 seconds. If the participant failed to give a response within the 30 seconds, then the trial was cancelled. As soon as the participant gave a response, the response time was recorded along with whether the selection was correct or not. Next, the participant was given some time to rest before proceeding to the next trial.

Figure 27:
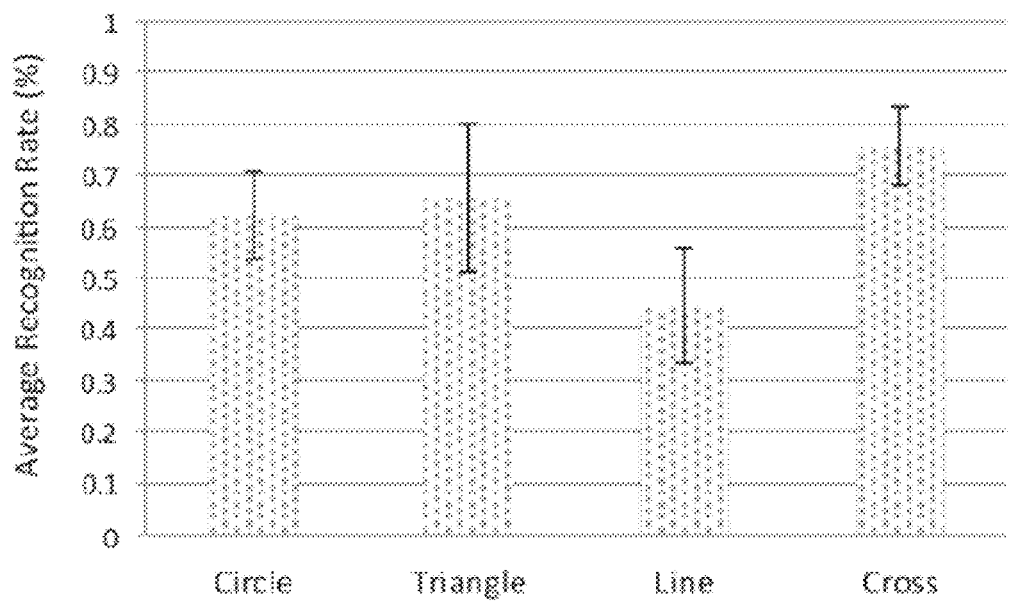
FIG. 27 is a graph showing an average recognition rate, along with a standard deviation, for each shape illustrated in FIG. 26.

The overall recognition rate for all subjects was well above the chance level (average of 59.44%, standard deviation of 12.75%). The overall recognition time had an average of 13.87 seconds and a standard deviation of 3.92 seconds. Looking at the recognition rate for each shape, the plus sign shape was the easiest to recognize, while the line shape was the most difficult to recognize. This could be because the line shape is easier to confuse with the circle and/or triangle shapes. The average recognition rate for all the shapes, along with the standard deviations, are shown in FIG. 27. It was also observed that one participant never got the triangle shape.

Figure 28:
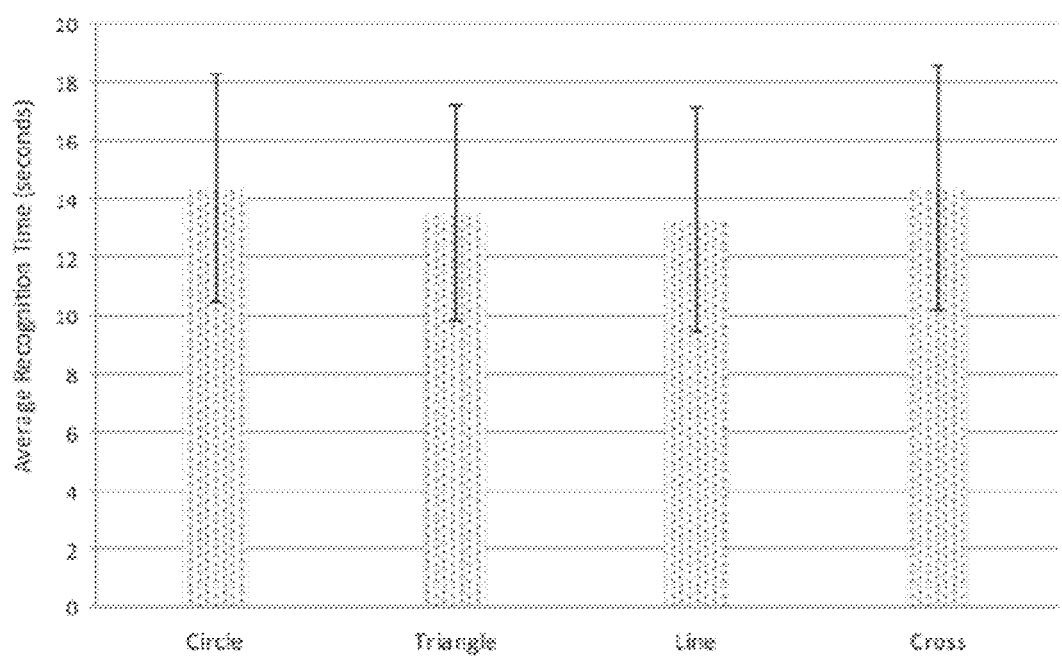
FIG. 28 is a graph showing an average recognition time, along with a standard deviation, for each shape illustrated in FIG. 26.

As for the recognition time, results show that the plus sign shape had the largest recognition time compared to other shapes, while the line shape had the lowest recognition time (FIG. 28). However, the differences are not that significant to derive definite conclusions about the recognition speed for each shape; more or less all shapes have similar recognition times.

In an effort to recognize which shapes were the most confusing, the data was analyzed to find errors across combinations of shapes. Table 3 shows the results (e.g., 14.45% is the percentage of confusing the triangle shape as a circle, and so on).

TABLE 3

Confusion Matrix Across the Four Shapes

|  | Circle | Triangle | Line | Plus sign |
| --- | --- | --- | --- | --- |
| Circle | 62.23% | 6.67% | 26.67% | 4.45% |
| Triangle | 14.45% | 65.56% | 12.23% | 7.78% |
| Line | 51.12% | 2.23% | 44.45% | 2.23% |
| Plus sign | 6.67% | 10.00% | 7.78% | 75.56% |

It seems that the line shape was mostly confused with circle (51.12% of the times line was confused and recognized as circle). The circle was also highly confused with the line (26.67%). The most clearly perceived shape was the plus sign; it had around 75% recognition rate, and was confused the least among the four shapes.

Even though it would be hard to derive statistically valid conclusions, a considerable improvement in performance from session to session was observed. In particular, there was a 14% improvement in the recognition rate and a 12% decrease in the recognition time. This clearly shows that users have quickly learned how to use the device and effectively perceive 2D shapes.

The embodiments described above are directed to a Haptogram system capable of displaying 3D tactile objects. The Haptogram system enables users to feel virtual objects without physical touches on any display devices. The Haptogram system may include one tile having a two-dimensional array of ultrasound transducers (e.g., 10 by 10 transducers). The ability of the Haptogram system to display various types of objects (single point, 2D shapes and 3D shapes) was validated in the experiments described above. As a result, it was confirmed that 1) humans can feel a localized focal point clearly (average force generated is 2.9 mN which is well above what human skin can perceive) and 2) the Haptogram system is highly precise in displaying tactile objects. The measured force along all displayed objects (single point, 2D objects and 3D objects) had an average of 2.65 mN and a standard deviation of 0.2 mN. In other words, the results showed that all displayed tactile objects are perceivable by the human skin (an average of 2.65 mN, standard deviation of 0.2 mN, for the 200 focal points that make up the 3D shape, over an elevation range of 8 cm to 18 cm).

Figure 22:
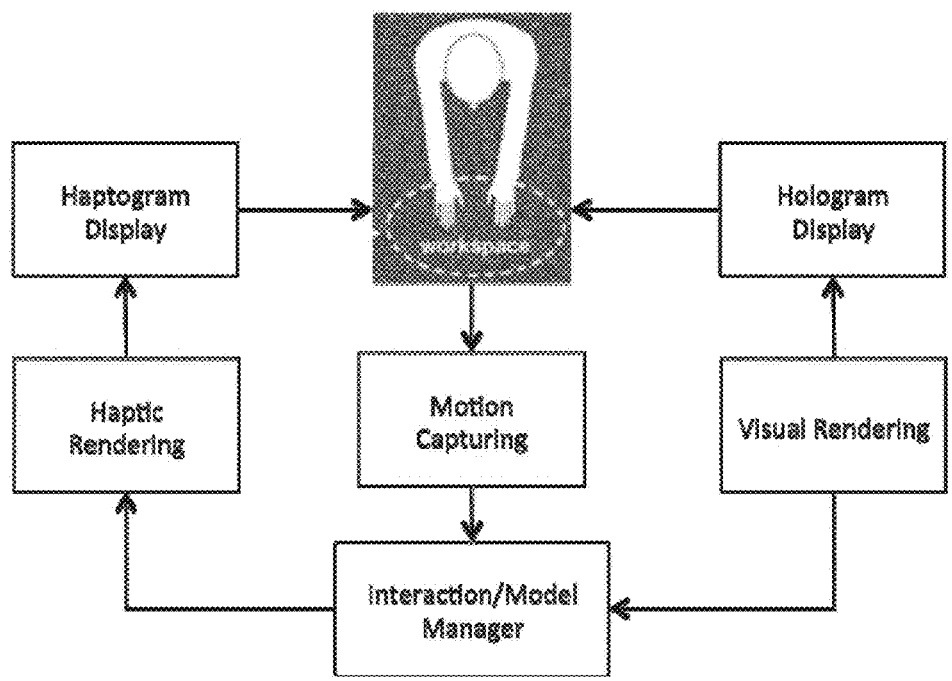
FIG. 22 is a schematic illustration of how a Haptogram system will be used in immersive multimodal interactive systems.

In one application, the three dimensional tactile feedback system can be integrated, for example, with a graphic hologram to build a complete multimodal immersive experience (auditory, visual, and tactile feedback). See FIG. 22. In other words, the Haptogram system may be an immersive multimodal system where subjects can touch graphics holograms. The Haptogram display may be synchronized with a hologram display, and/or a hand motion tracking device such as Leap Motion™ or Microsoft Kinect™. One of ordinary skill in the art would appreciate other applications of the three dimensional tactile feedback system described above.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the disclosure's operating conditions and arrangement of the embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus or processing circuit on data stored on one or more computer-readable storage devices or received from other sources.

The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

What is claimed is:

1. A three dimensional tactile feedback device comprising:
    an array of ultrasonic transducers configured to project discrete points of tactile feedback in three dimensional space;
    a controller configured to control the array of ultrasonic transducers, the controller including a primary memory configured to store information related to generating each focal point; and
    a focal point calculation component configured to calculate: 1) a distance between each focal point and each transducer in the array of ultrasonic transducers, and 2) a stimulation timing of each transducer,
    wherein the tactile feedback device is configured to continuously switch the discrete points of tactile feedback at a frequency at which a human is capable of perceiving tactile stimulation in order to produce tactile stimulation of a three dimensional object in free space, and
    wherein the calculated distances and stimulation timings are stored in the primary memory as the information related to generating each focal point.

2. The three dimensional tactile feedback device of claim 1, wherein the array of ultrasonic transducers comprises a plurality of tile units, each tile unit having a two-dimensional array of ultrasonic transducers.

3. The three dimensional tactile feedback device of claim 2, wherein each tile comprises a ten by ten two-dimensional array of ultrasonic transducers.

4. The three dimensional tactile feedback device of claim 1, further comprising a point cloud representation component including a plurality of 3D point cloud representations, each 3D point cloud representation including a plurality of discrete points that correspond to a single point, a two dimensional object or a three dimensional object,
    wherein the controller is further configured to input a 3D point cloud representation corresponding to a desired single point, two dimensional object or three dimensional object, and project the discrete points of the 3D point cloud representation into three dimensional space to produce tactile stimulation of the desired single point, two dimensional object or three dimensional object in free space.

5. The three dimensional tactile feedback device of claim 1, further comprising a graphical user interface.

6. The three dimensional tactile feedback device of claim 1, further comprising an amplifier circuit configured to receive and amplify synchronized pulse signals generated by the controller to stimulate the array of ultrasonic transducers.

7. The three dimensional tactile feedback device of claim 1, wherein the controller further comprises:
    a secondary memory configured to store a sequence of index numbers,
    wherein each index number corresponds to the information stored in the primary memory that is related to a particular focal point.

8. The three dimensional tactile feedback device of claim 1, wherein the information stored by the primary memory includes at least one of a timing queue for each of the ultrasonic transducers, a cycle length, a pulse length, and a pre-scalar clock divider value.

9. The three dimensional tactile feedback device of claim 1, wherein the controller further comprises a memory controller, a cycle controller, and a pulse generator, the memory controller configured to extract the information stored in the primary memory that is related to the particular focal point and provide the information to the cycle controller and the pulse generator.

10. The three dimensional tactile feedback device of claim 9, wherein the cycle controller is configured to determine a width of a period of a pulse used to stimulate the array of ultrasonic transducers to project discrete points of tactile feedback in three dimensional space.

11. The three dimensional tactile feedback device of claim 9, wherein the pulse generator is configured to generate pulses for each ultrasonic transducer at an appropriate time in order to project the discrete points of tactile feedback related to the particular focal point in three dimensional space.

12. The three dimensional tactile feedback device of claim 1, wherein the controller comprises a field-programmable gate array (FPGA) controller.

13. A method of producing a tactile stimulation of a three dimensional object comprising:
    providing a three dimensional tactile feedback device comprising:
        a two-dimensional array of ultrasonic transducers; and
        a controller configured to control the array of ultrasonic transducers, the controller including a primary memory configured to store information related to generating each focal point;
    importing information related to a particular focal point from the primary memory of the controller;

calculating 1) a distance between each focal point and each transducer in the array of ultrasonic transducers, and 2) a stimulation timing of each transducer, wherein the calculated distances and stimulation timings are stored as the information related to a particular focal point in the primary memory;

projecting discrete points of tactile feedback in three dimensional space with the array of ultrasonic transducers; and continuously switching the discrete points of tactile feedback at a frequency at which a human is capable of perceiving tactile stimulation in order to produce tactile stimulation of a three dimensional object in free space.

14. The method of claim 13, wherein the information comprises at least one of a timing queue for each of the ultrasonic transducers, a cycle length, a pulse length, and a pre-scalar clock divider value.

15. The method of claim 13, wherein projecting discrete points of tactile feedback in three dimensional space further comprises determining a width of a period of a pulse used to stimulate the array of ultrasonic transducers to project discrete points of tactile feedback in three dimensional space.

16. The method of claim 15, wherein projecting discrete points of tactile feedback in three dimensional space further comprises generating pulses for each ultrasonic transducer at a predetermined time in order to project the discrete points of tactile feedback related to the particular focal point in three dimensional space.

17. The method of claim 16, wherein projecting discrete points of tactile feedback in three dimensional space further comprises amplifying synchronized pulse signals generated by the controller to stimulate the array of ultrasonic transducers.

18. A computer-implemented machine for three dimensional tactile feedback, comprising:
   a processor;
   a three dimensional tactile feedback device comprising:
      a two-dimensional array of ultrasonic transducers;
      a controller configured to control the ultrasonic transducers, the controller including a primary memory configured to store information related to generating each focal point;
   a tangible computer-readable medium operatively connected to the processor and including computer code configured to:
      import information related to a particular focal point from the primary memory of the controller;
      calculate 1) a distance between each focal point and each transducer in the array of ultrasonic transducers, and 2) a stimulation timing of each transducer, wherein the calculated distances and stimulation timings are stored as the information related to a particular focal point in the primary memory;
      project discrete points of tactile feedback in three dimensional space with the ultrasonic transducers; and
      continuously switch the discrete points of tactile feedback at a frequency at which a human is capable of perceiving tactile stimulation in order to produce tactile stimulation of a three dimensional object in free space.

* * * * *